United States Patent [19]

Duncan et al.

[11] Patent Number: 4,907,160

[45] Date of Patent: Mar. 6, 1990

[54] INTERSECTION MONITOR

[75] Inventors: Gary Duncan, Torrance; John Michael, Anaheim; Henry Zwicky, Yorba Linda, all of Calif.

[73] Assignee: Econolite Control Products, Inc., Anaheim, Calif.

[21] Appl. No.: 206,905

[22] Filed: Jun. 10, 1988

Related U.S. Application Data

[63] Continuation of Ser. No. 817,480, Jan. 9, 1986, abandoned.

[51] Int. Cl.⁴ .............................................. G06F 15/48

[52] U.S. Cl. .................................... 364/436; 340/907; 379/106

[58] Field of Search ................ 342/456; 364/427, 428, 364/436, 437, 438; 340/907, 909, 910, 911, 912, 915, 916, 917, 918, 919, 924, 931; 379/39, 40, 42, 47, 51, 106

[56] References Cited

U.S. PATENT DOCUMENTS

| | | | |
|---|---|---|---|
| 3,764,972 | 10/1973 | Siklos et al. | 340/915 |
| 3,828,307 | 8/1974 | Hungerford | 340/915 X |
| 4,135,145 | 1/1976 | Eberle | 340/931 |
| 4,167,784 | 9/1979 | McReynolds et al. | 340/911 |
| 4,167,785 | 9/1979 | McReynolds et al. | 340/911 |
| 4,204,189 | 5/1980 | Weyer | 340/909 |
| 4,250,483 | 2/1981 | Rubnes | 340/914 |
| 4,257,029 | 3/1981 | Stevens | 340/911 |
| 4,356,485 | 10/1982 | Boschulte et al. | 340/931 X |
| 4,383,240 | 5/1983 | Staats, Jr. | 340/915 |
| 4,449,116 | 5/1984 | Hill et al. | 340/909 |
| 4,463,339 | 7/1984 | Frick et al. | 340/916 |
| 4,602,334 | 7/1986 | Salesky | 340/903 |

OTHER PUBLICATIONS

Traffic Engineering and Control, Aug. 1983, "Industrial News".

Traffic Engineering and Control, Mar. 1985, "Maintenance of Traffic Signals in London", Oastler K. H. S.

Traffic Engineering and Control, "Microelectrons and Intersection Control and Linkage: OPTU (Outstanding Pilot and Transmission Unit", Texier.

Remac Brochure: The New Traffic Light Monitoring System, GEC Traffic Automation Limited.

*Primary Examiner*—Thomas H. Tarcza

*Assistant Examiner*—Tod R. Swann

*Attorney, Agent, or Firm*—Christie, Parker & Hale

[57] ABSTRACT

An intersection monitor for remote monitoring of traffic intersection controllers. A central computer is connected through the public telephone system to intersection monitors, one of which is located at each remote intersection. The remote intersection monitor monitors the operation of the intersection controllers and related equipment and, upon detecting the malfuntions of a preselected priority, report such malfunctions by placing calls through the public telephone system to the central computer. The central computer, by placing a call on the telephone system, also may interrogate each of the remote intersection monitors and transfer operating instructions to each monitor. Vehicle and pedestrian detectors also are monitored by each remote intersection monitor and unusual activity or inactivity of such detectors is reported by the remote intersection monitor to the central computer.

7 Claims, 35 Drawing Sheets

POWER

SUMMARY

Real Time Interrupt At 120 Hz.

CONTROLLER TIMING DIAGNOSTICS

CONTROLLER TIMING DIAGNOSTICS (cont'd)

CONTROLLER TIMING DIAGNOSTICS (cont'd)

LOGGING

LOGGING (CONTINUED)

FLASH DIAGNOSTICS

FLASH DIAGNOSTICS (cont'd)

DETECTOR DIAGNOSTICS

Dectector Time of Day Plan Selection

DETECTOR DIAGNOSTICS (cont'd)

DETECTOR DIAGNOSTICS (CONT'D)

NEMA CYCLE FAIL DIAGNOSTICS

NEMA CYCLE FAIL DIAGNOSTICS (CONT'D)

APPLY RECALL

CREATE NEMA INTERVAL BITS

INTERSECTION MONITOR

CROSS-REFERENCE TO RELATED APPLICATIONS

This is a continuation of application Ser. No. 06/817,480, filed Jan. 9, 1986, now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention pertains to automobile traffic intersection controls. More particularly, it pertains to the monitoring of the operation of the equipment controlling the traffic signals at an intersection.

The automobile traffic signals and the pedestrian "walk" signals at an intersection typically are controlled by an "intersection controller" located at the intersection. The controller operates the automobile traffic signals and the pedestrian signals at the intersection in a manner that produces non-interfering traffic movement. A standard nomenclature for such controllers in the United States has been set forth in Section 14 of the National Electrical Manufacturers Assocation (NEMA) Standards Publication No. TS1-1983, and interface standards for such controllers are set forth in Section 13 of the same publication.

Each mode of traffic flow at the intersection is denoted as a "phase". Included within each phase is the operation of the green signals indicating the directions in which traffic is allowed to move in the particular phase, the yellow signals warning of the pending termination of traffic movement, and, in some cases, the initial operation of red signals for a period of time sufficient to allow for clearance of traffic through the intersection before the green signals in the next phase are operated to initiate the next phase of traffic flow. If neither the green nor the yellow signal in a red, green, yellow cluster is "on", then the red signal is "on" to the indicate the directions in which traffic may not move.

As indicated in Section 14 of the NEMA publication, the sophistication of the operation of the controller may range from the simple to the complex. For instance a "single" ring controller operates the signals at an intersection so as to produce traffic flow in a sequence of phases arranged so as to occur in an established order. In response to demands by automobile and pedestrian detectors the controller may extend or shorten the period of time during which traffic flows in each phase. However, in a single ring system, the sequence of phases cannot be altered. For example, in an intersection without left turn signals, a single ring controller can be programmed to allow traffic flow in the north/south directions to continue without interruption until an automobile is detected on the east/west street, at which time the phase allowing north/south traffic flow is terminated and the phase allowing east/west traffic flow is initiated. Depending upon the programming in the controller, the east/west phase may then remain in operation until traffic is detected on the north/south approaches to the intersection or until the expiration of a predetermined period. Sophisticated single ring controllers may extend the interval in which one phase operates in response to continued demand, or may shorten the interval in response to demands for operation of other phases. Although the duration of each phrase may be altered by the single ring controller, the sequence of phases cannot be changed.

A "dual-ring" controller allows two independent sequences, or rings, of phases to operate simultaneously at an intersection. A dual-ring controller allows some variation in the sequence of patterns or phases of traffic flow. Certain limitations must be imposed, however, to avoid interfering traffic movement.

FIG. 1A depicts a typical intersection of two streets, one oriented in a north/south direction, the other oriented in the east/west direction. As an example, the phases of a two ring controller may be allocated to the traffic flow for the intersection as follows. Phase 1 allows northbound traffic to turn left at the intersection. Phase 2 allows southbound traffic to proceed straight through the intersection while at the same time allowing north/south pedestrian traffic to cross the street on the west side of the intersection. Phase 5 allows the southbound traffic to turn left at the intersection and phase 6 allows northbound traffic to proceed straight through the intersection while also allowing north-/south pedestrian traffic to cross on the east side of the intersection. Phases 3 and 4 and 7 and 8 similarly relate to east-west traffic. As a consequence, regardless of whether phase 1 or phase 2 is in operation, either phase 5 or phase 6 also may be in operation. That is, during the period when phase 1 allows northbound traffic to turn left, either phase 5, which allows southbound traffic to turn left, or phase 6, allows northbound traffic to proceed straight through the intersection, also may be in operation. However, while phase 1, which allows northbound traffic to turn left, is in operation, southbound traffic cannot be allowed to proceed straight through the intersection, i.e., phase 2 cannot be allowed. Although phase 5 may proceed to phase 6 independent of the progression from phase 1 to phase 2, phase 6 cannot proceed to phase 7 until the sequence of phase 1 and 2 is ready to proceed to phase 3, i.e., the east and west bound traffic flow represented by phases 3 and 4 and 7 and 8 cannot begin until the north and south flows represented by phases 1, 2, 5 and 6 are terminated. Similarly, phases 1, 2, 5 and 6 cannot be initiated until phases 3, 4, 7 and 8 terminate.

The more sophisticated controllers which adjust the sequence and the duration of the various phases of traffic flow in response to traffic and pedestrian demands decrease the waiting times for the vehicular traffic and for the pedestrians when these controllers and the related equipment are operating correctly. Such adaptation to demand, however, can result in inefficient operation and increased traffic delays if any of the traffic or pedestrian detectors malfunction or if the controller itself malfunctions.

In addition to the intersection controller and the pedestrian and automobile detectors, each intersection usually includes a conflict monitor and flasher equipment. The conflict monitor is a fail safe device which monitors the operation of the various signals. If for any reason, a combination of traffic signals are "on" simultaneously which would allow interfering traffic flow, the conflict monitor directs the flasher equipment to disconnect all of the traffic signals from the intersection controller and to connect the red signals to a flasher, thus placing all of the red signals in a "red" flashing mode. The flasher equipment also can be set to flash yellow on the "main" street and red on the cross street.

2. Description of the Prior Art

In the past, citizen complaints and reports from municipal employees or police have been used to detect and report obvious malfunctions of the system. For instance when a controller is "stuck" in a particular phase such that no cross traffic is allowed, when all the signals are out, or when the intersection is in the red flashing mode, such malfunctions are readily apparent and, because of the extent of the disruption, are quickly detected and reported. As a consequence, such major malfunctions are repaired shortly after they occur. More subtle malfunctions, such as the failure of an automobile detector which prevents the controller from adjusting the timing of each phase in response to traffic demands, are not easily detected by the casual observer. Because it is often not economically practical to have the traffic signal system inspected in a timely manner by personnel who have been trained to detect such non-catastrophic malfunctions, such malfunctions often exist undetected and unreported for long periods of time. As a consequence, after a significant period of operation, the more subtle malfunctions tend to become wide spread in such sophisticated traffic control systems. For instance, in an article titled "Maintenance of Traffic Signals in London" by K. H. S. Oastler, in the March, 1985 issue of Traffic Engineering and Control inspections were reported to have found anywhere from 40 to 98% of the intersections to have major or minor faults. Although such faults may not completely disrupt traffic flow, they nevertheless cause traffic to flow less efficiently. Accordingly, it is important that such sophisticated systems provide a means to monitor and report non-catastrophic as well as catastrophic malfunctions.

In traffic systems that are controlled from a central location some prior art systems have including means for malfunction detection. In such a central control system the outputs from the automobile and pedestrian detectors are all brought to the central location and the phases at each intersection are all directly controlled from the central point. As a consequence it is relatively simple to include malfunction detection equipment at the central location. The expensive communication capacity, however, that is required between the central location and the various intersections often makes such central control uneconomic. Because of this economic limitation, the vast majority of intersection controllers today are each located at an associated intersection and operate independently from each other. Thus, there is a need for a system for monitoring and reporting malfunctions in the operation of each intersection controller, but in a manner which does not carry with it a requirement for extensive dedicated communication facilities between the central monitoring point and the controllers at the remote intersections.

SUMMARY OF THE INVENTION

This invention utilizes a central computer and a system of controller monitors, one of which is located at each intersection and which monitors the operation of the controller, the associated automobile and pedestrian detectors and the related flashing equipment at the intersection. Upon detecting a malfunction that merits immediate attention, the monitor reports the malfunction to a central computer by means of the public telephone system. Because each monitor communicates to the central computer only when necessary to report such malfunctions, a dedicated communication system is not required and the expense of such a dedicated system is avoided. The central computer communicates with the remote monitors only when it wishes to interrogate a monitor for a particular purpose or to change the operating parameters in the remote system. Here again, only intermittant communication is required.

Traffic systems presently are being developed in Great Britain which utilize a central computer, the public telephone network and monitors located at the remote intersections, to monitor the operation of the controllers. However, because the mechanization of the traffic control system in England is quite different from that the United States, the remote-monitoring systems being developed in England are inapplicable here. See for example, the "Remac" system being developed by G. E. C. Traffic Automation Limited, Borehamwood, Herts, England, and the Ferranti remote signal monitoring system being developed by Ferranti Data Systems Group, Edinburgh, Scotland. Furthermore, the systems being developed in Great Britain apparently do not provide for detecting malfunctions in automobile and pedestrian detectors nor for monitoring of flash systems such as those that are included as part of the traffic control systems in the United States.

DESCRIPTION OF THE PREFERRED EMBODIMENT

Figure 1:
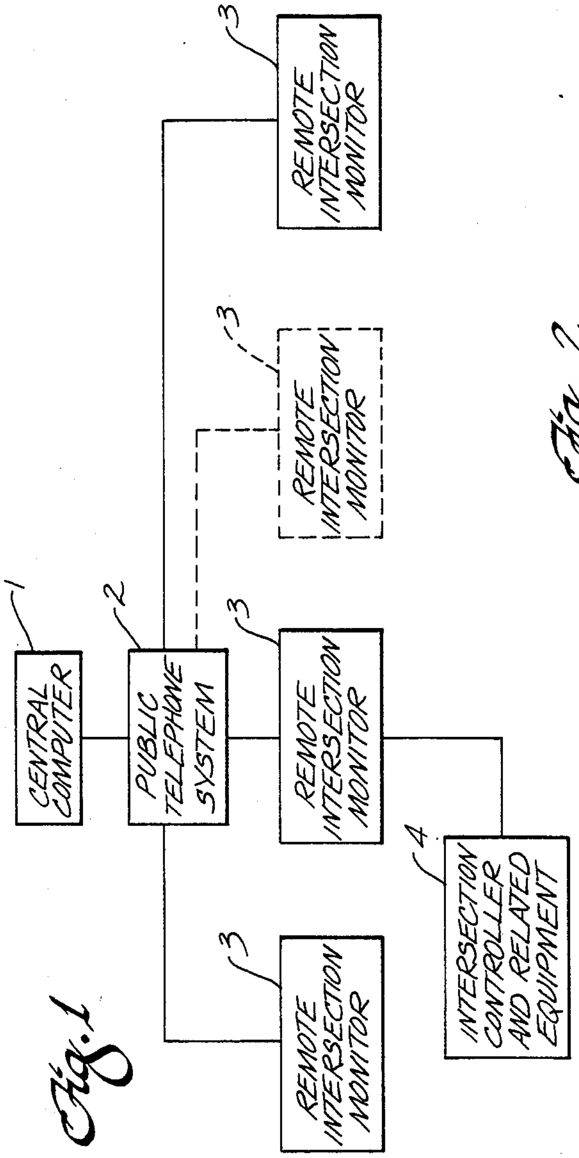
FIG. 1 is a block diagram of the system that includes the invention.

FIG. 1 is a block diagram of the system. Central computer 1 is connected by the public telephone system 2 to a number of remote intersection monitors 3. Each remote intersection monitor in turn, is connected to intersection controller 4 and the associated equipment at the intersection.

Figure 2:
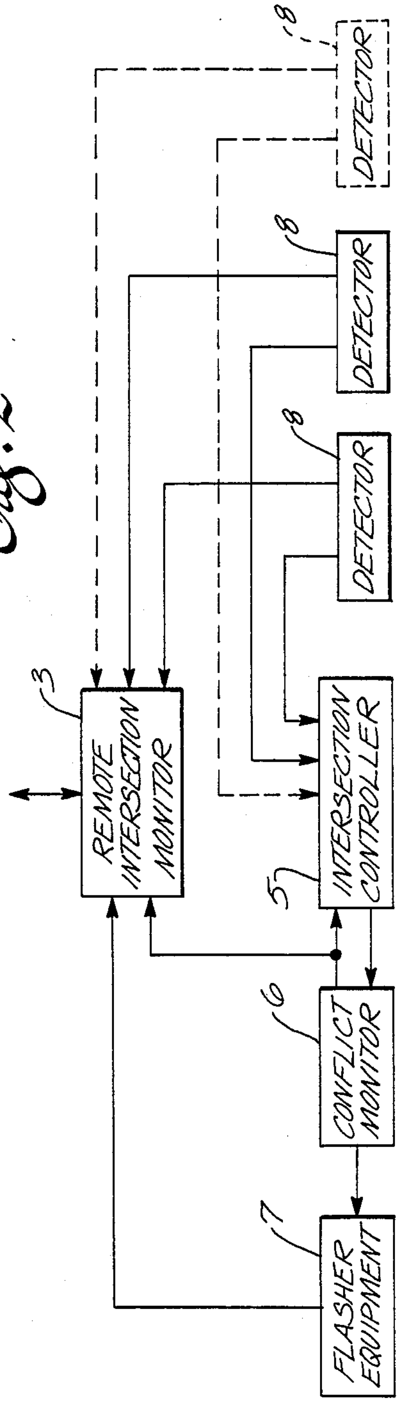
FIG. 2 is a block diagram showing the connection between the Remote Intersection Monitor and the other equipment at the intersection.
Figure 1A:
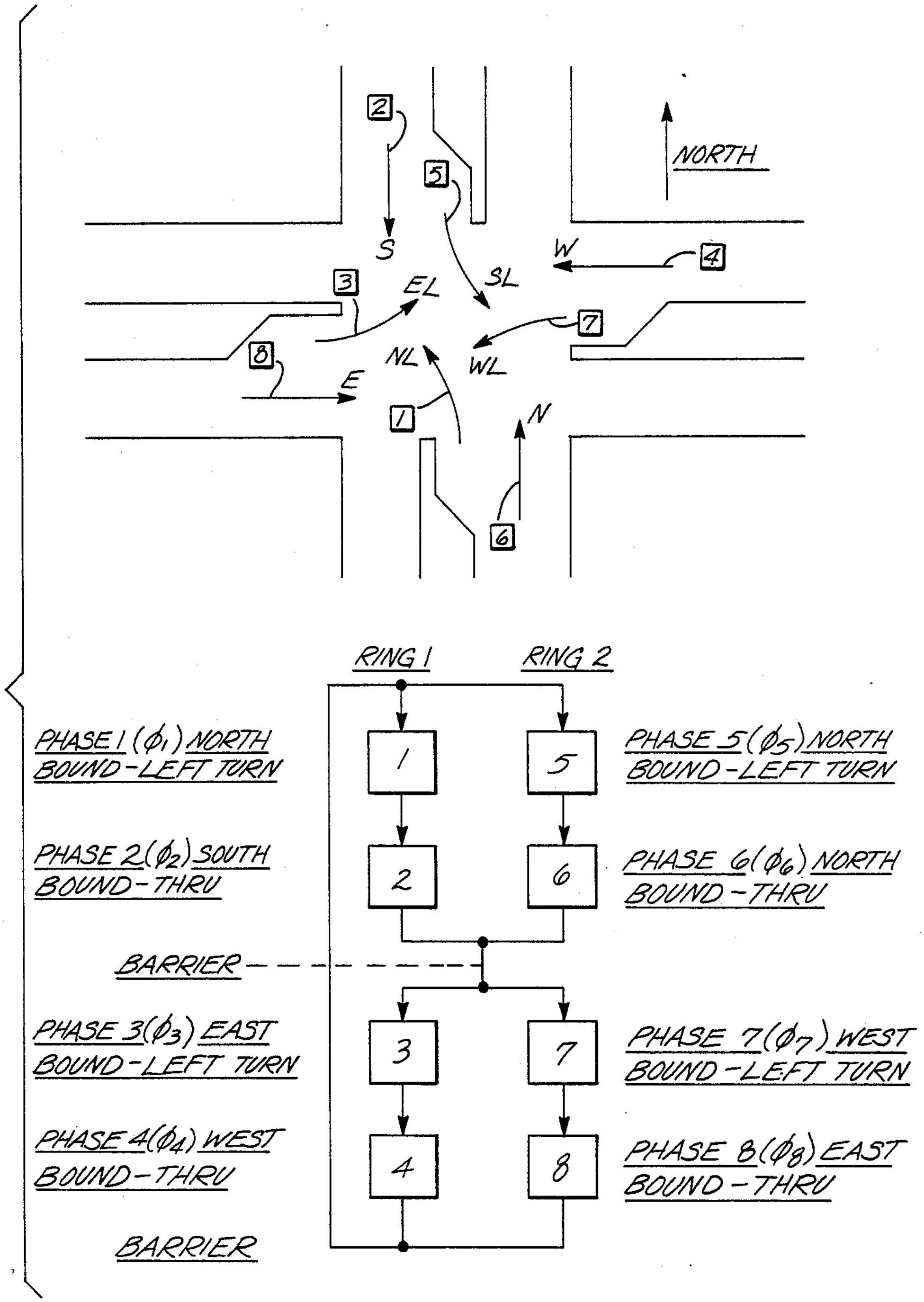
FIG. 1A depicts a traffic intersection.

FIG. 2 is a block diagram illustrating in more detail the interconnection of each remote intersection monitor 3 with the intersection controller and associated equipment located at the intersection namely, intersection controller 5, conflict monitor 6, flasher equipment 7 and a number of automobile and pedestrian detectors 8.

Figure 3A:
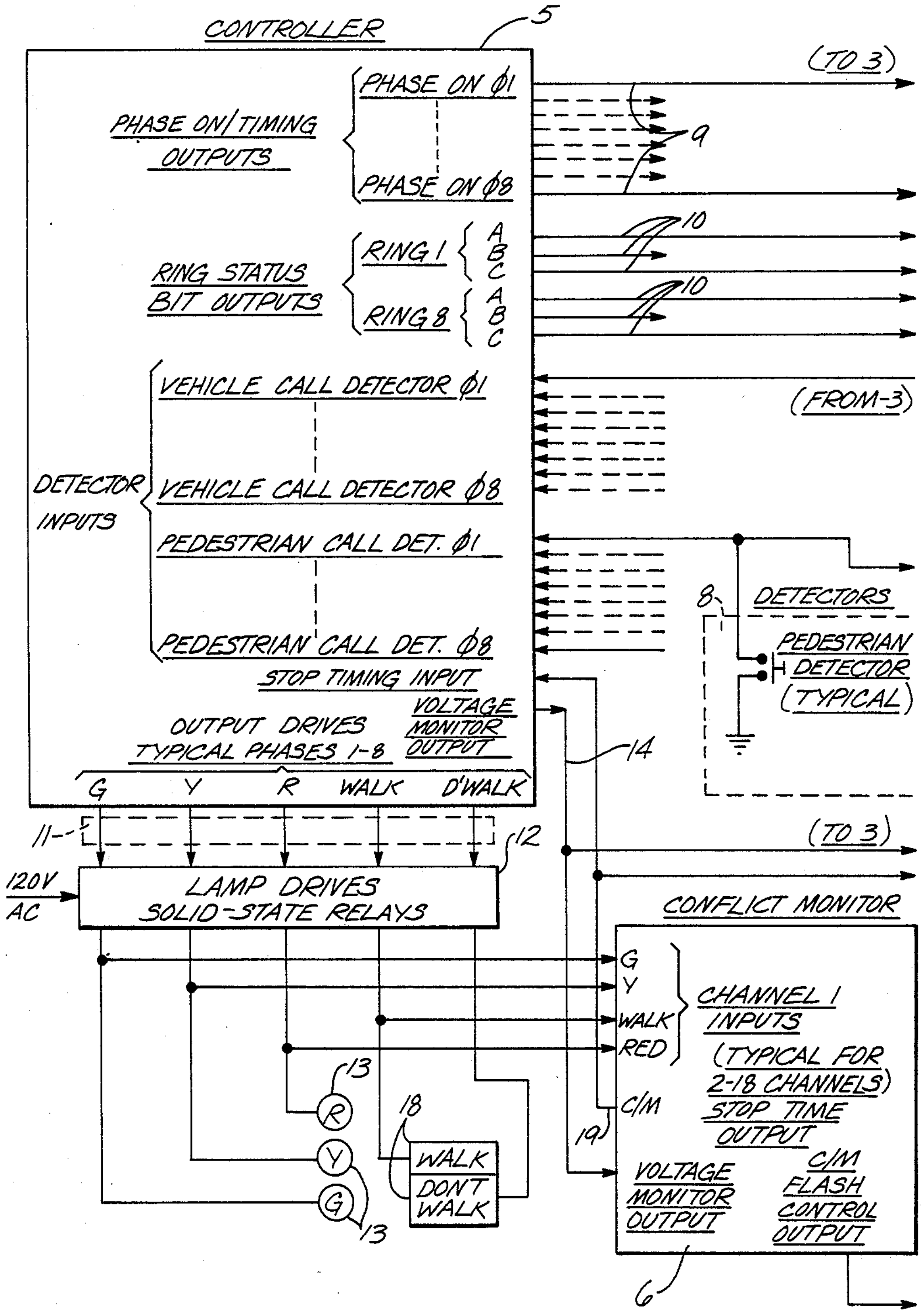
FIGS. 3A and 3B and 4A and 4B depict in more detail the interconnection between the monitor and the equipment at the intersection.
Figure 3B:
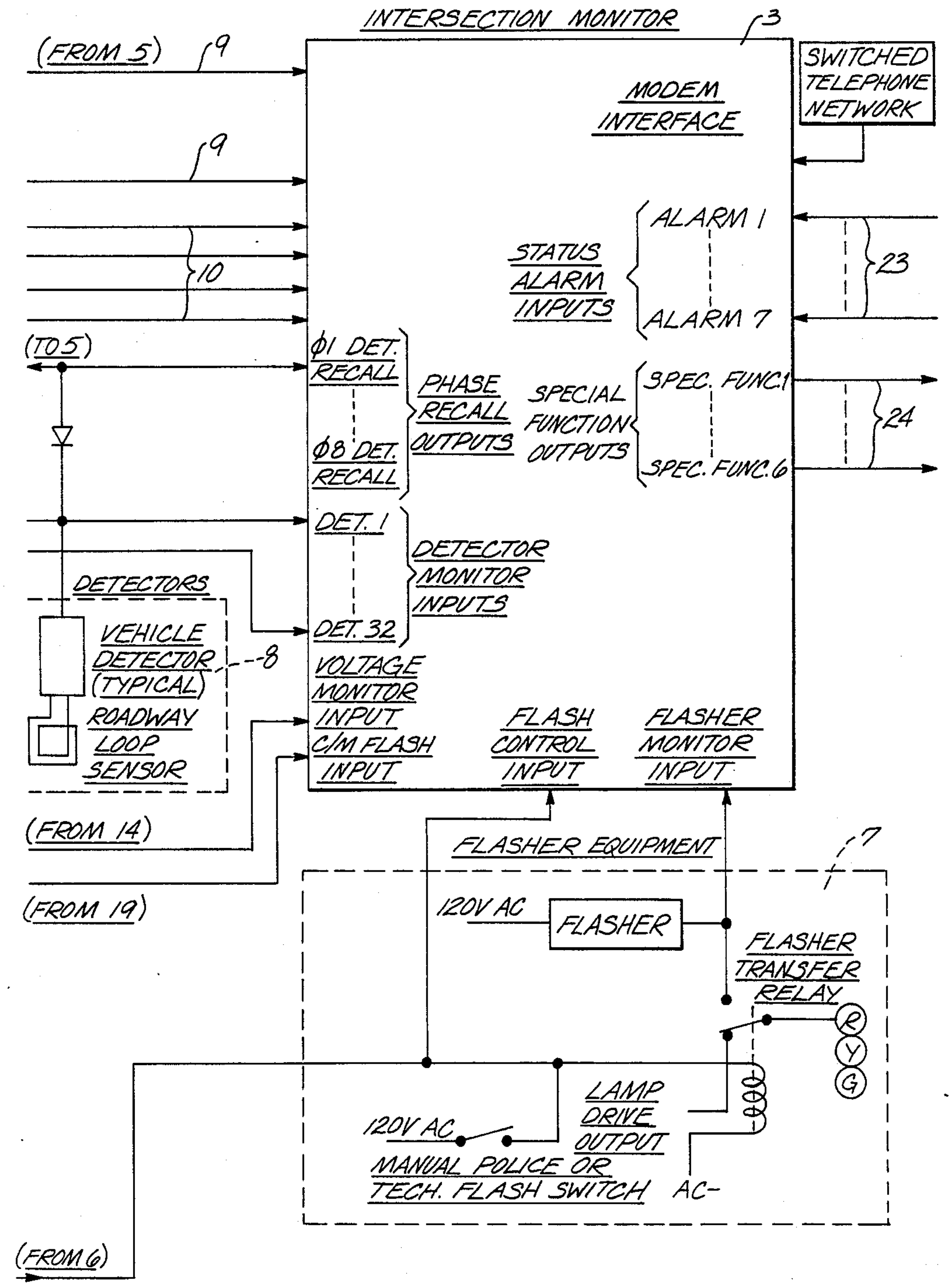

FIGS. 3A and 3B depict in more detail the interconnections between intersection monitor 3, intersection controller 5, conflict monitor 6, flasher equipment 7 and the pedestrian and vehicle detectors 8. As required for a two ring system by section 13 of the NEMA standards, controller 5 outputs phase "on" signals 9 which indicate which traffic phase is active, and outputs ring status bits 10 for each of the two rings which indicate the status of the operation of the controller within each of the active phases. The relationship of the status bits and the operation of the controller within a particular phase is specified in Section 14.3.2 of Section 14 of the NEMA publication.

Referring again to FIGS. 3A and 3B, controller 5 also has output drivers 11 which control the green, yellow, red, walk and don't walk signals for each phase. The output drivers, in turn, operate the solid state relays 12 for the various clusters of red, yellow and green signals 13. Controller 5 also provides a voltage monitor output 14 which sends a warning to conflict monitor 6 in the event of an internal controller voltage failure.

Controller 5 receives inputs from the pedestrian and vehicle detectors 8 to which it responds by adjusting the timing of each of the phases.

Conflict monitor 6 directly monitors the voltages supplied to the green, yellow and red signals and the walk signals of the various phases. In the event that voltages are simultaneously supplied to a green, yellow or walk signal in each of two phases that produce interfering traffic flow, the conflict monitor, by means of its conflict monitor flash control output 15, turns on flasher equipment 7 and causes flasher equipment 7 to disconnect all traffic signals from the power source and to connect all of the red signals (or the signals that are to flash) to flasher 16, which flasher provides a pulsating voltage to the red signals at the rate of 60 pulses per minute causing these signals to flash. The conflict monitor also checks for the absence of a green, yellow, or red signal on all phases. If no signal is present the signals for that phase are dark, thus creating a potential hazard. To prevent this, the conflict monitor activates the flasher equipment. When so activated, flasher equipment 7 sends a signal to flasher control input 17 of intersection monitor 3 to indicate that the flashing equipment has been turned on by the conflict monitor 6 and also provides a flasher monitor input 18 to intersection monitor 3 by which monitor 3 is able to monitor the pulsating voltage applied by flasher 16.

As indicated in FIGS. 3A and 3B, monitor 3 is connected to the phase outputs 9 and status bit 10 outputs by controller 5. By means of these outputs, monitor 3 compares the periods of time during which the intersection controller is operating in each phase and compares the periods of time for each state within each phase to preselected minimum and maximum periods. If a period of time is less than the minimum or exceeds the maximum, then monitor 3 places a call through public telephone system 2 to the central computer and informs the central computer of the malfunction. 'Public telephone system' means any communication system wherein the communication link between monitor 3 and central computer 1 is not dedicated in its entirety solely to use for this communication. As indicated in FIGS. 3A and 3B, intersection monitor 3 also monitors output 19 from conflict monitor 6, which output is activated when the conflict monitor detects a conflict and instructs controller 5 to stop its timing sequence.

As indicated in FIGS. 3A and 3B, monitor 3 monitors the output from detectors 8 and compares the activity of such detectors to preselected activity standards. If the inactivity of any detector exceeds a preselected period of time or if any detector is on continuously for a period exceeding a preselected maximum time, such event is considered a malfunction and recorded as such by monitor 3. In the event of such a malfunction and if so directed by the central computer, intersection monitor 3 by means of its detector recall outputs 20, can send a signal to controller 5 for any vehicle detector, in the same manner as if the related vehicle detector had sent a detection signal to controller 5. A detector recall output that is directed to send such a signal to controller 5 is said to be placed in the "recall state".

Rather than place a telephone call to the central computer in response to the detection of each malfunction, monitor 3 reports such malfunctions in accord with a predetermined priority. "Priority 1" events are reported immediately. At the time a priority 1 event is reported, all previously unreported priority 2 and 3 events also are reported. A "priority 2" event is reported after a preselected delay, which delay is initiated after the occurrence of the first priority 2 event. At the end of the delay, the initial priority 2 event, together with any additional priority 2 or 3 events occurring during the delay are reported. "Priority 3" events are recorded and held for reporting only at such time as a priority 1 or priority 2 event is reported. "Priority 4" events are neither reported nor stored in memory. A priority 4 event, however, is reported when a status report is requested in response to interrogation from the central computer. By use of such priorities, the practical reporting requirements of malfunctions by monitor 3 is satisfied without the attendant cost of unnecessary use of the public telephone system.

At the direction of the central computer, monitor 3 also may monitor the activity of selected pedestrian or vehicle detectors, accumulate records of such activity and, upon interrogation by the central computer, transfer to the central computer data representing the aggregate of such activity.

Figure 4A:
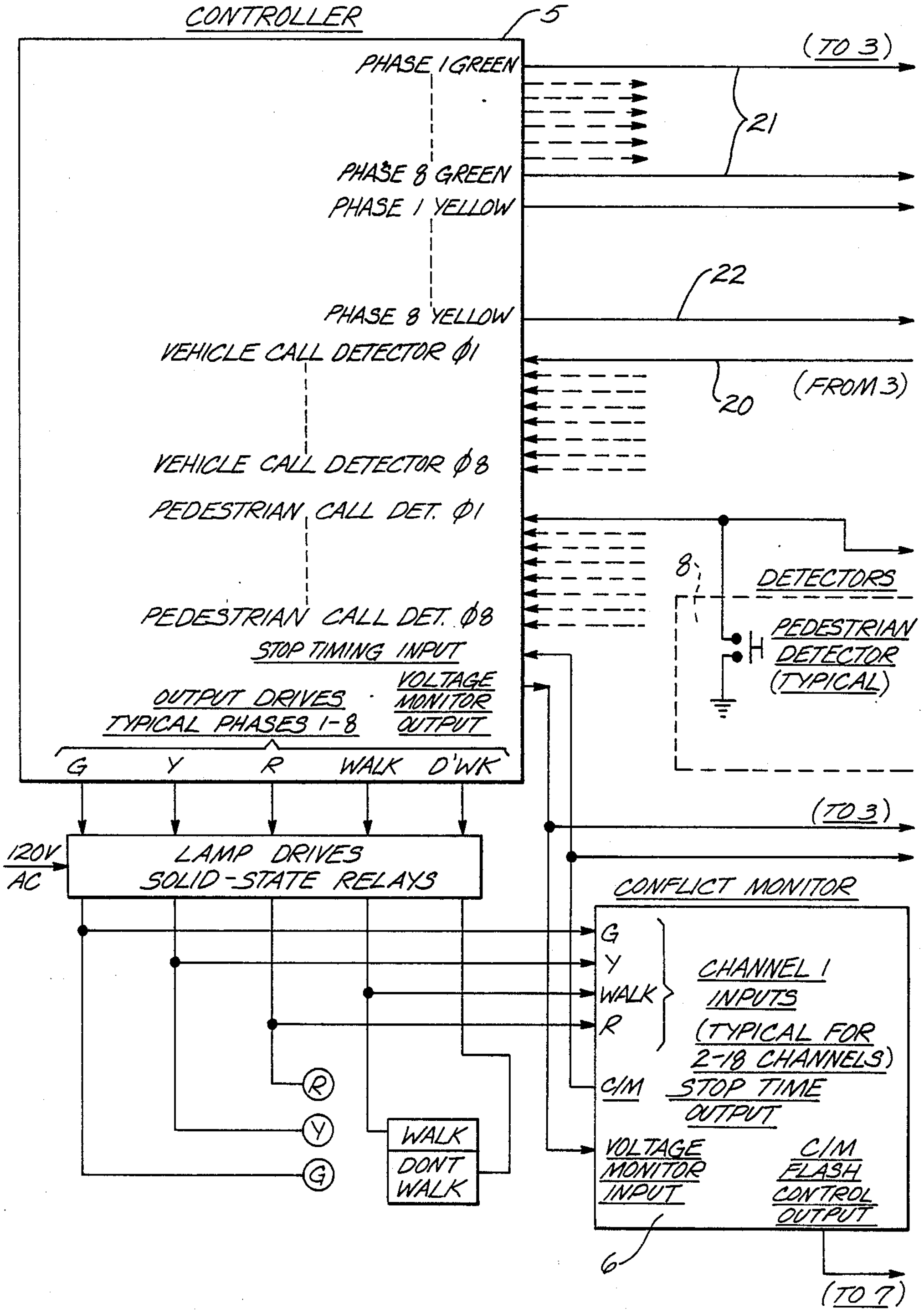
Figure 4B:
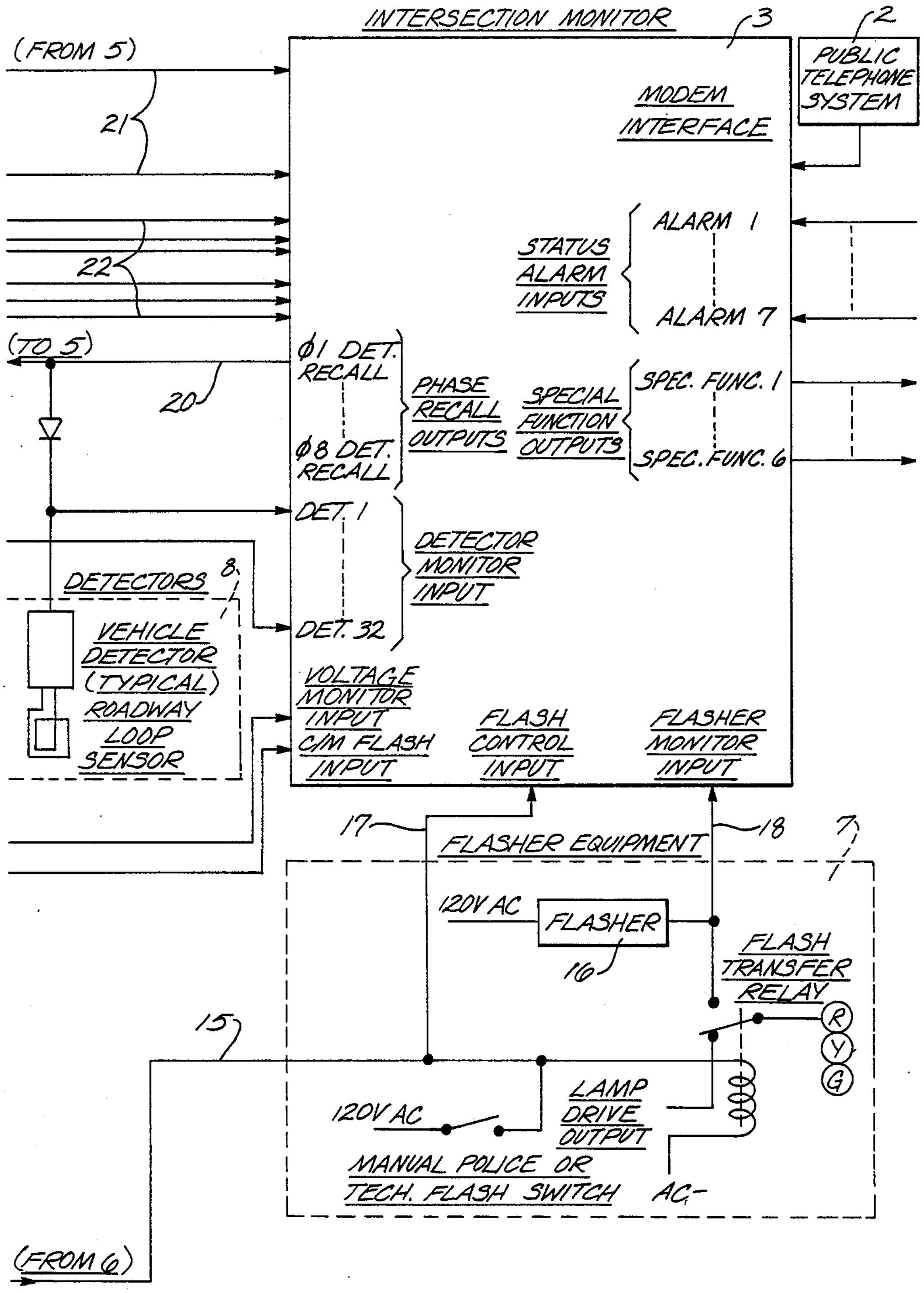

FIGS. 4A and 4B depict the inter-connection of controller 5 and intersection monitor 3 in the circumstance where controller 5 does not include ring status bit outputs. In this circumstance, the outputs 21 for the green signals for each phase and the outputs 22 for the yellow signals for each phase from controller 5 are monitored by intersection monitor 3 and compared with preselected minimum and maximum periods to detect malfunctions. In the event a malfunction is detected, the intersection monitor 3 responds as described above.

As indicated in FIGS. 4A and 4B, the intersection monitor 3 has seven status alarm inputs 23 which may be connected to auxillary equipment at the intersection to monitor the on-off status of equipment. Six of the inputs require a DC voltage and the seventh requires a 120 VAC input to indicate an "on" condition. An alarm input, for instance, may be connected to a mechanical switch attached to the door to the equipment cabinet and thus be used to monitor whether or not the door is open. A priority of 1 to 4 can be assigned to each of the alarm inputs so that its "on" status is reported accordingly.

Also depicted in FIGS. 4A and 4B are six special function outputs 24 which exhibit a simple open or closed switch behavior under the control of the central computer. The special function outputs thus may be used to control equipment at the intersection from the central monitor. Two of the special function outputs may be "reset" at the monitor, that is, if the central computer has sent a command turning on the output, the output may be manually turned off at the monitor.

Each intersection monitor includes a microprocessor, associated memory input/output circuits interfacing the microprocessor with the various items of equipment that are monitored, a modem connecting the processor to the public telephone network and a power supply. In the preferred embodiment, the microprocessor is a Motorola 6808 microprocessor.

FIGS. 5 through FIGS. 33 are flow diagrams that depict the operation of the computer program that is contained in the memory of the microcomputer and which controls the operation of the microprocessor, and hence, the operation of the intersection monitor. Submitted with this application is a listing in the appendix of the source code for the computer program used in the preferred embodiment.

Figure 5:
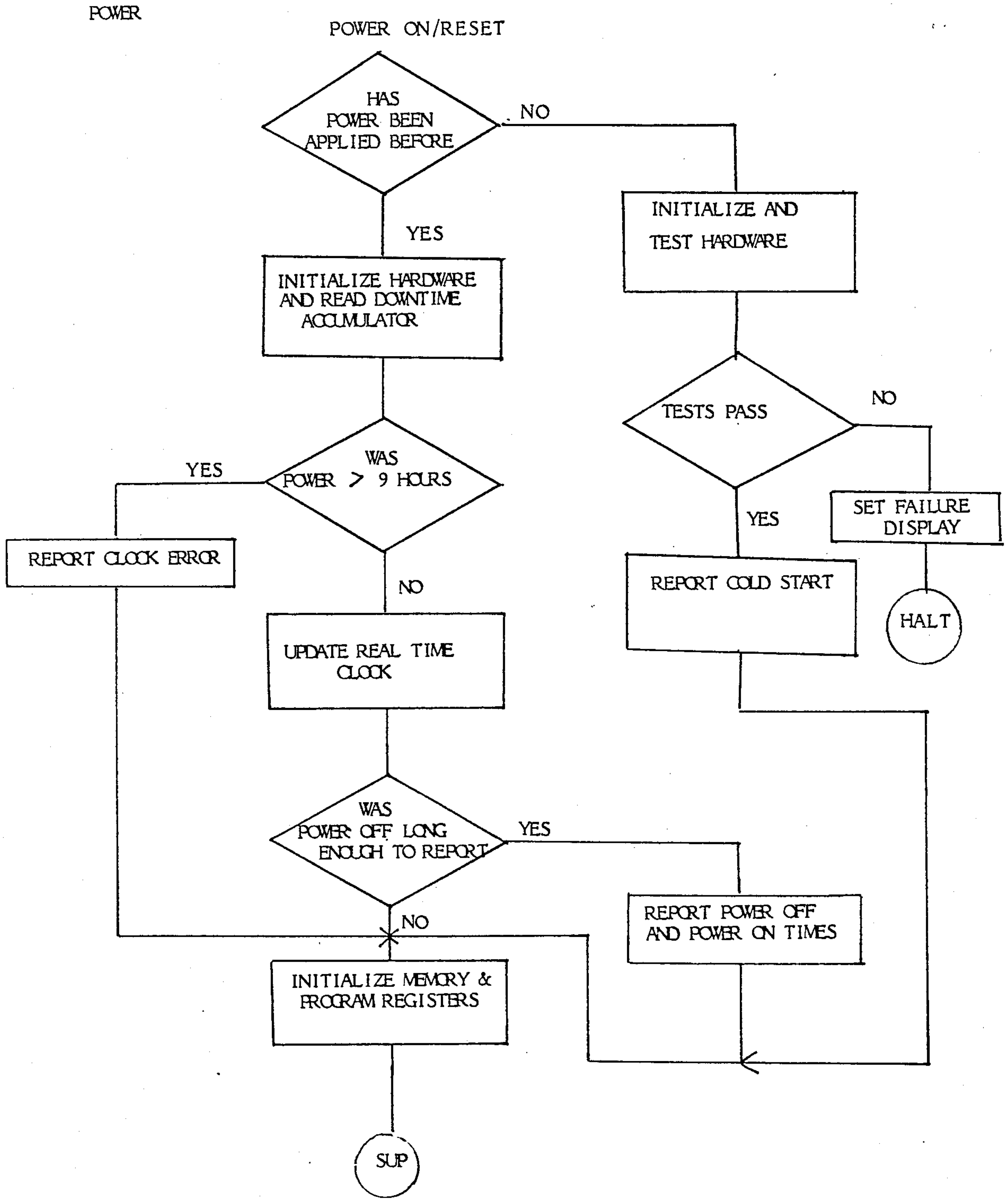
FIGS. 5 through 33 are flow diagrams of the computer program used in the invention.
Figure 6:
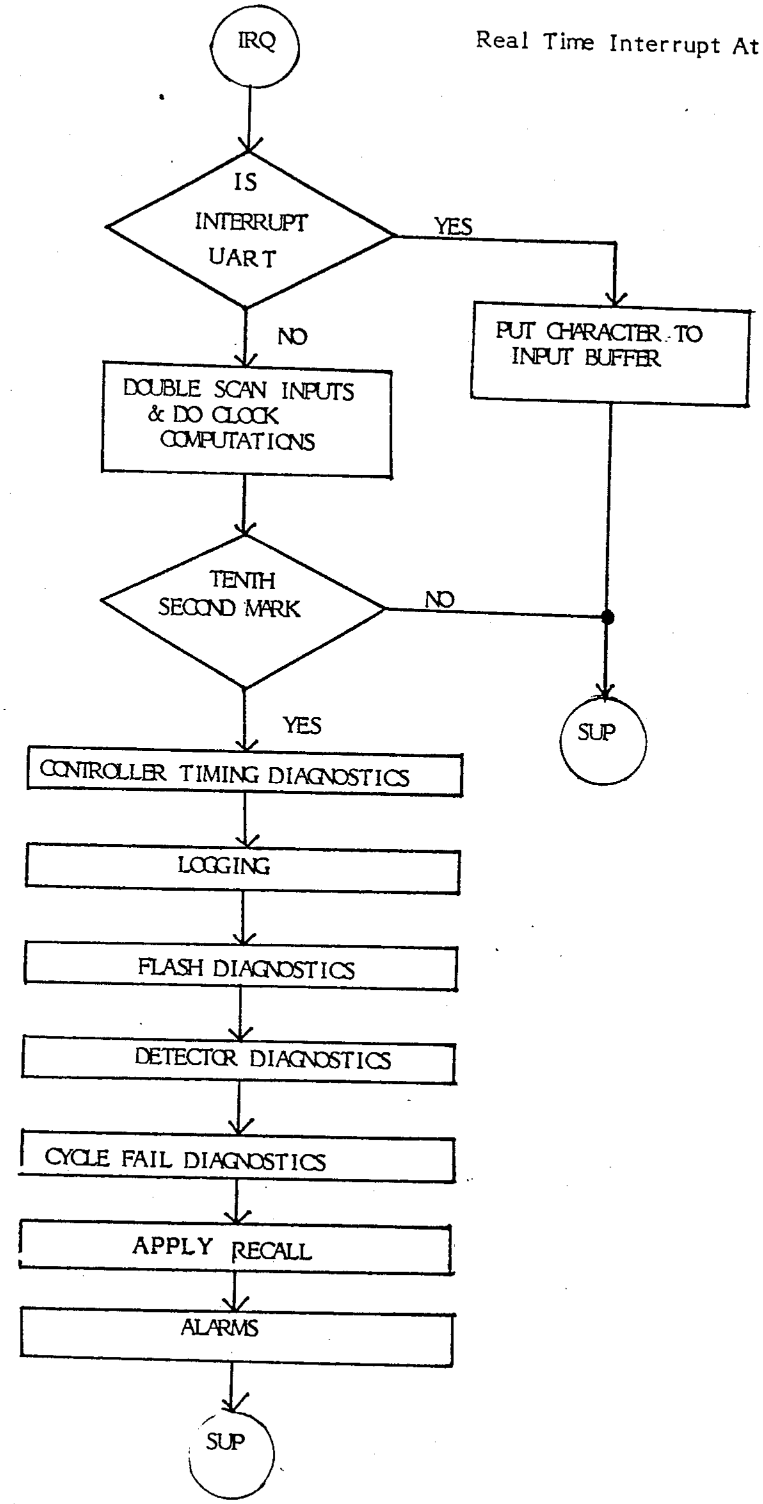
Figure 7:
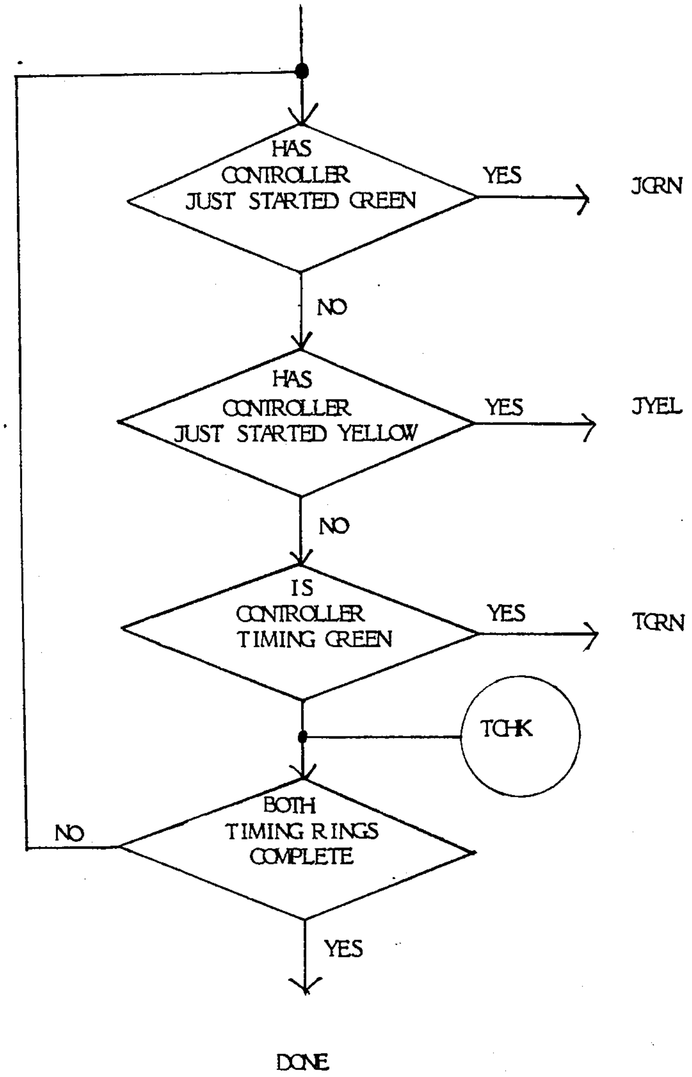
Figure 8:
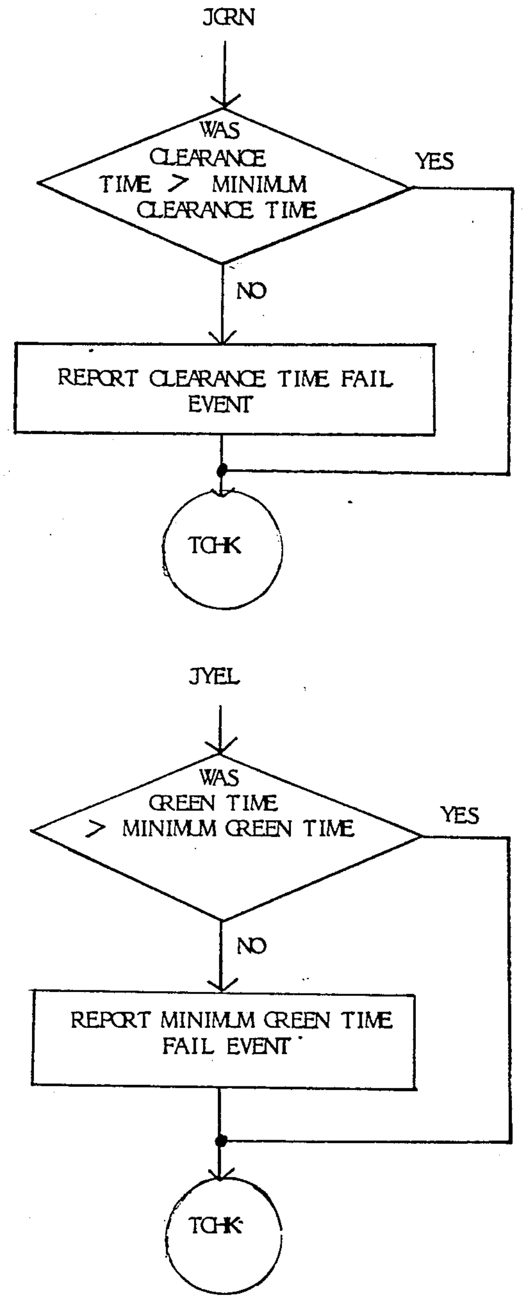
Figure 9:
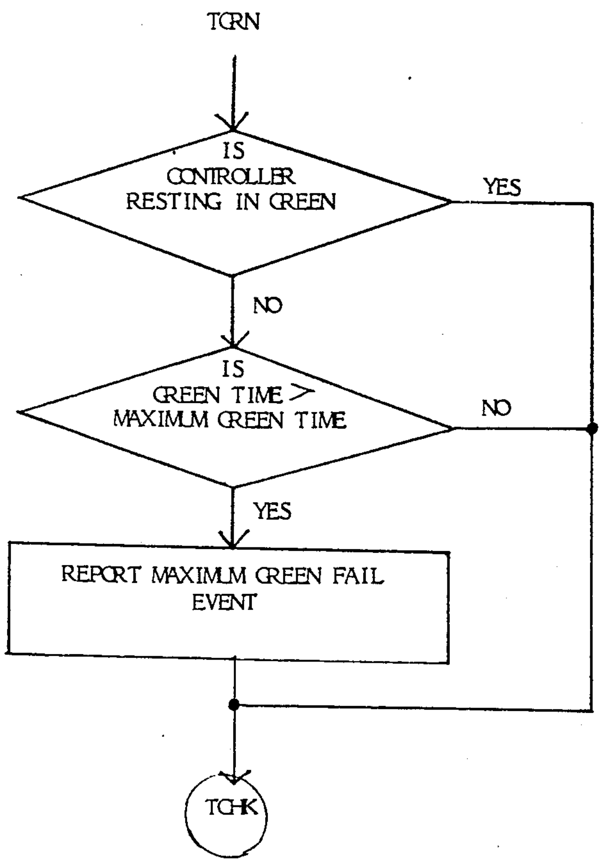
Figure 23:
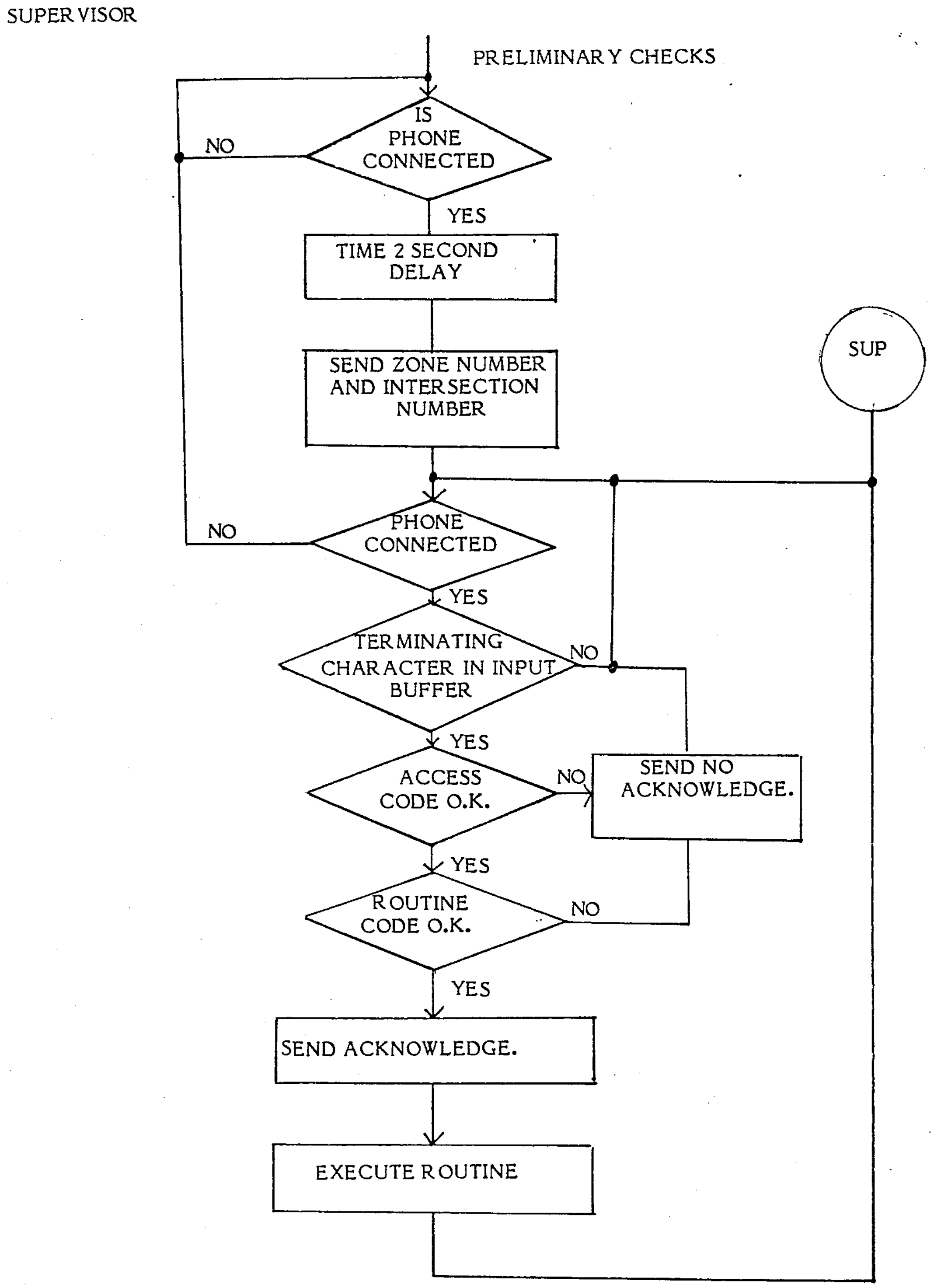
Figure 24:
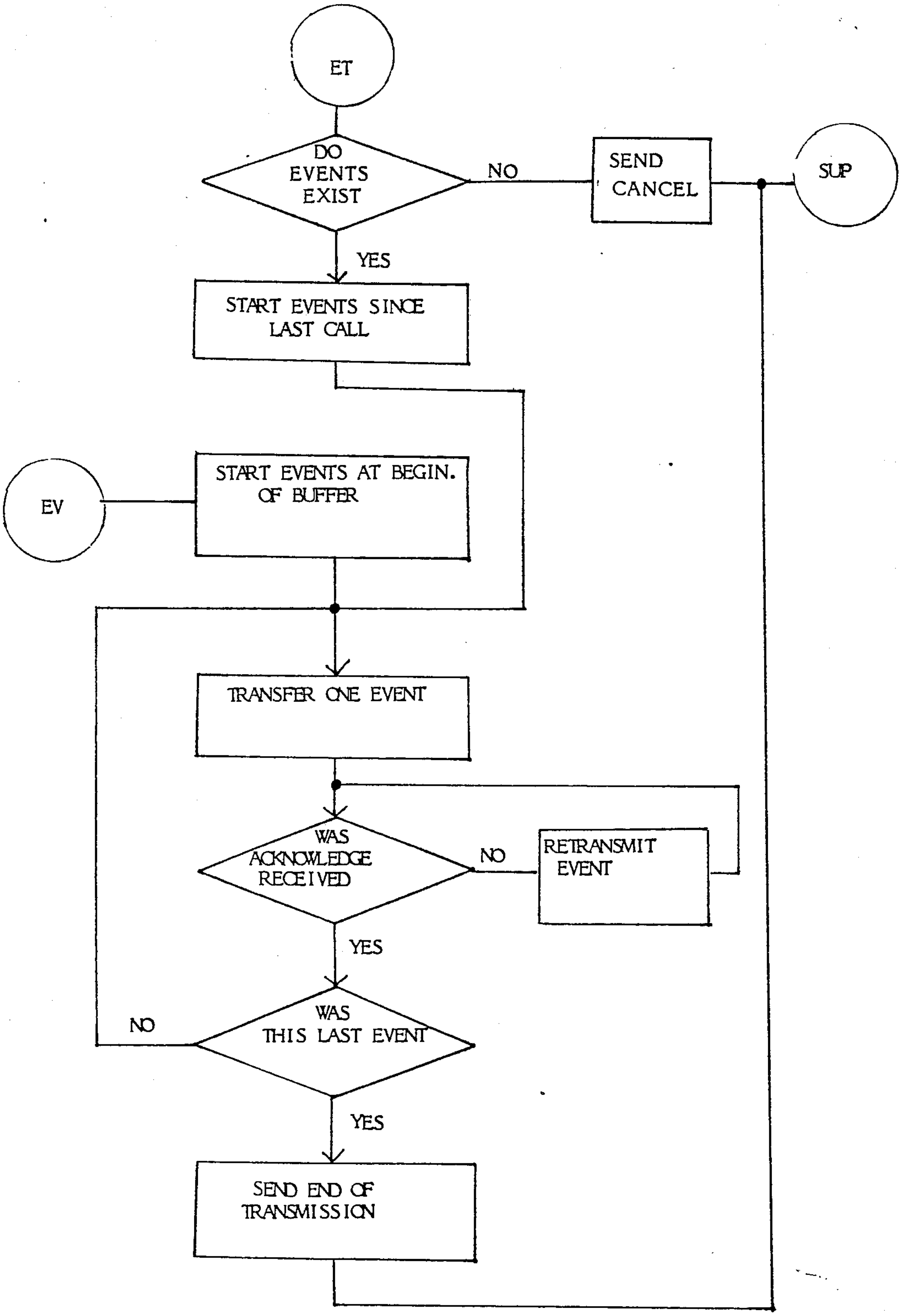
Figure 25:
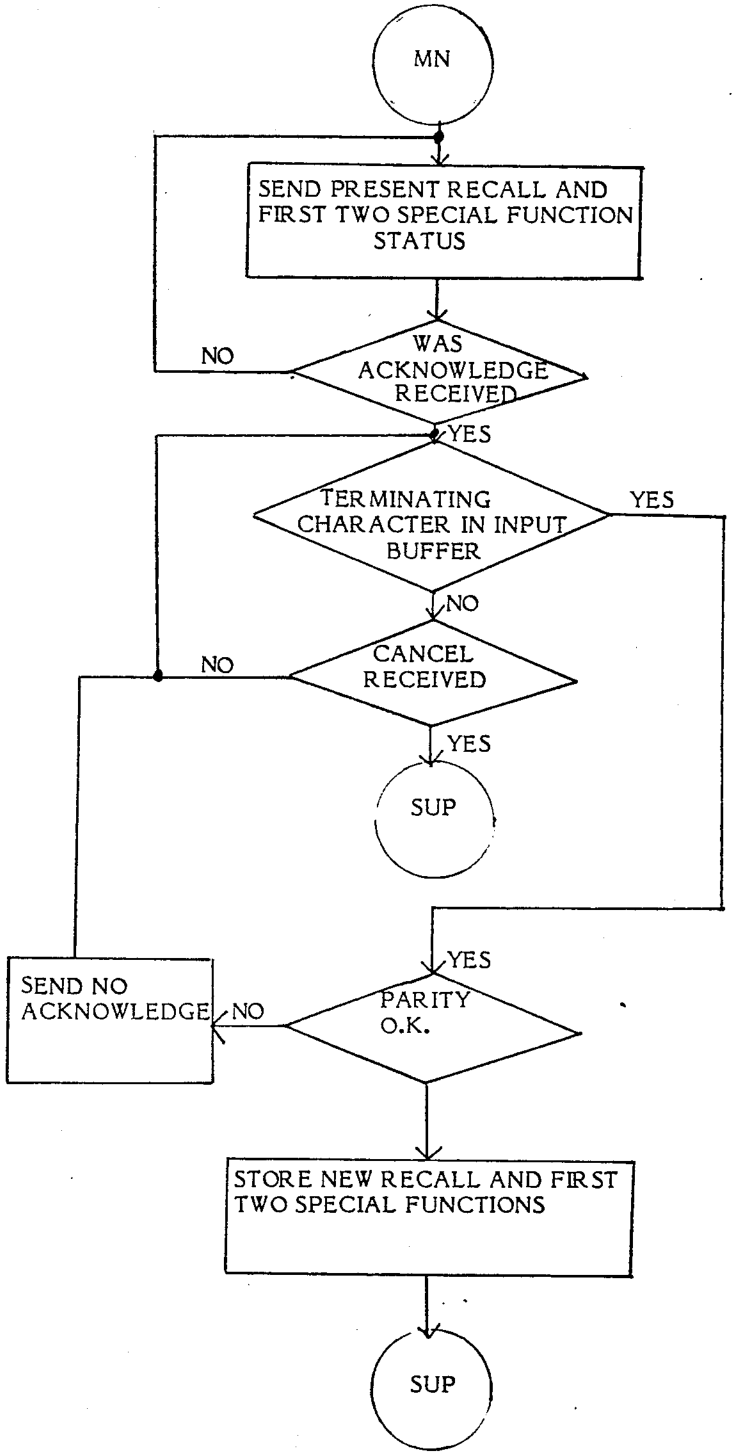
Figure 26:
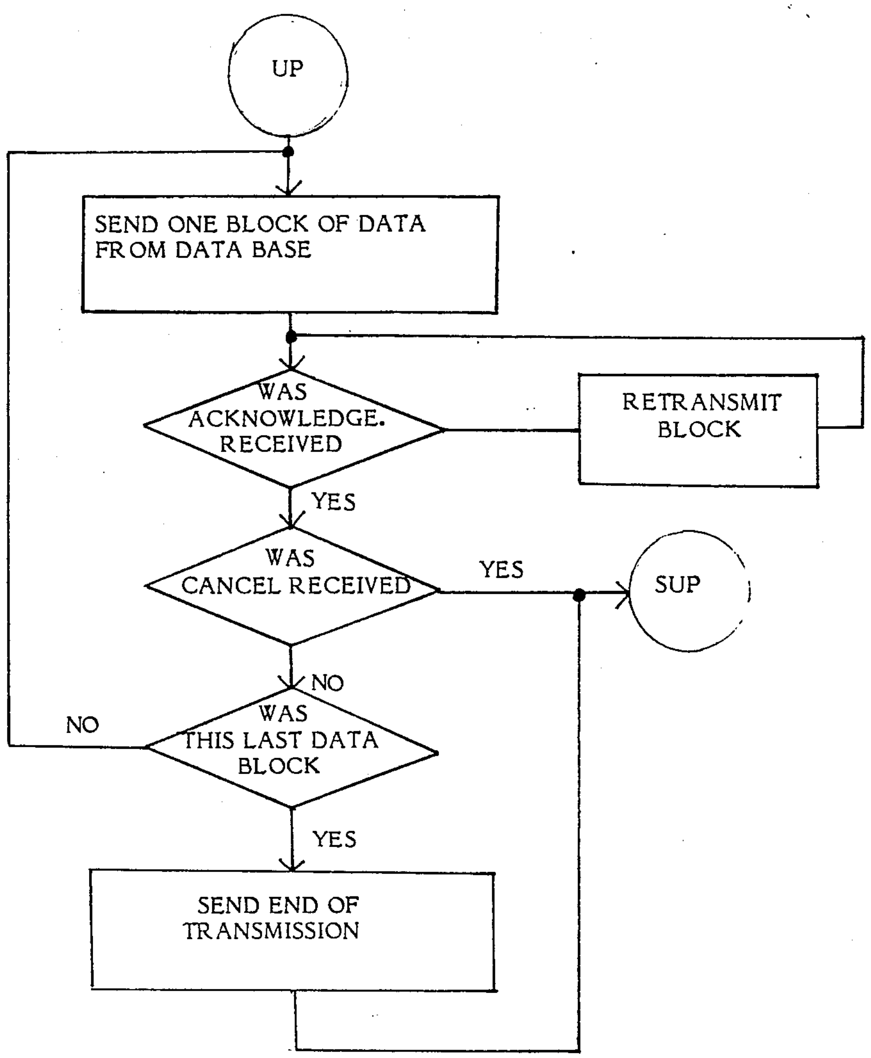
Figure 27:
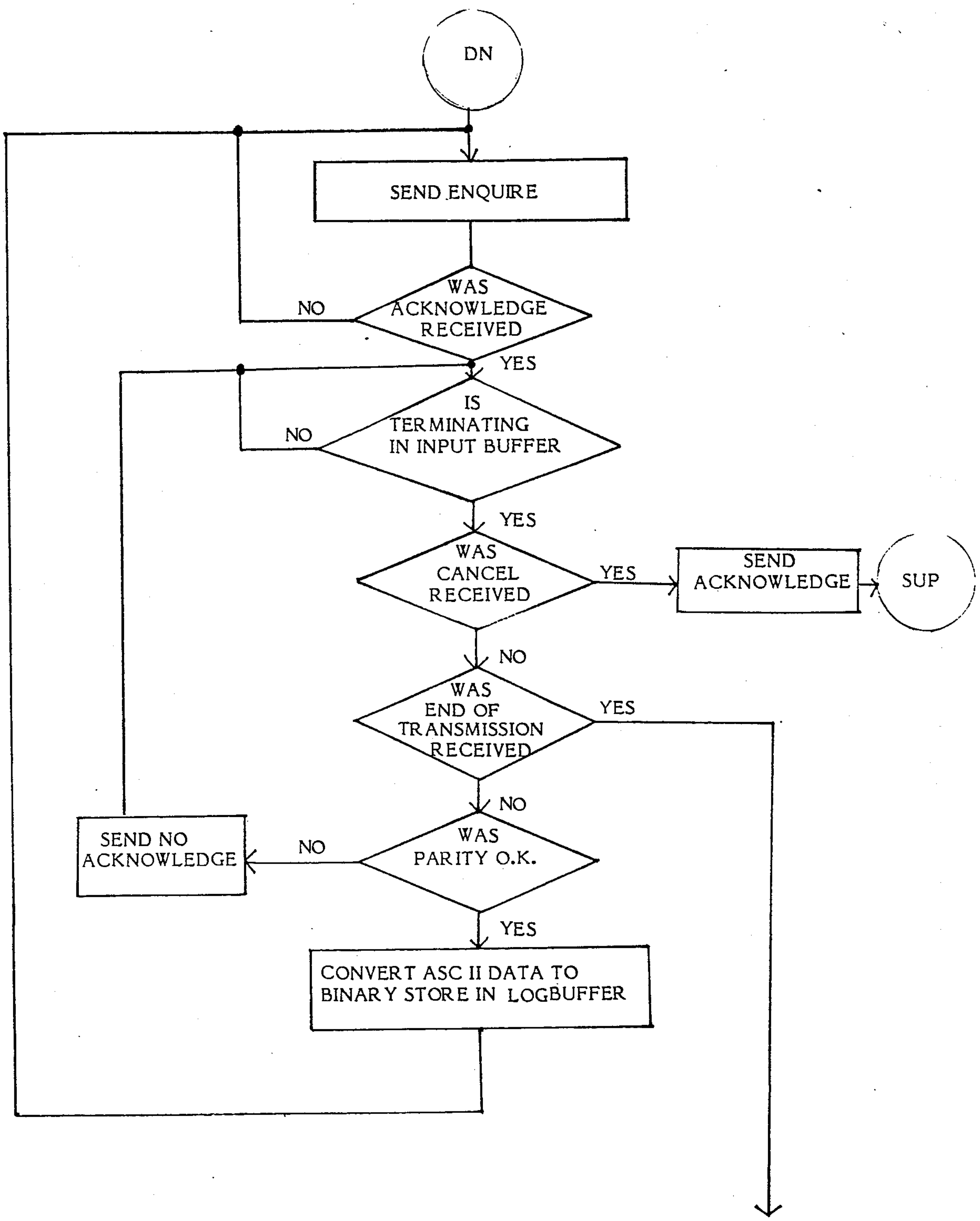
Figure 28:
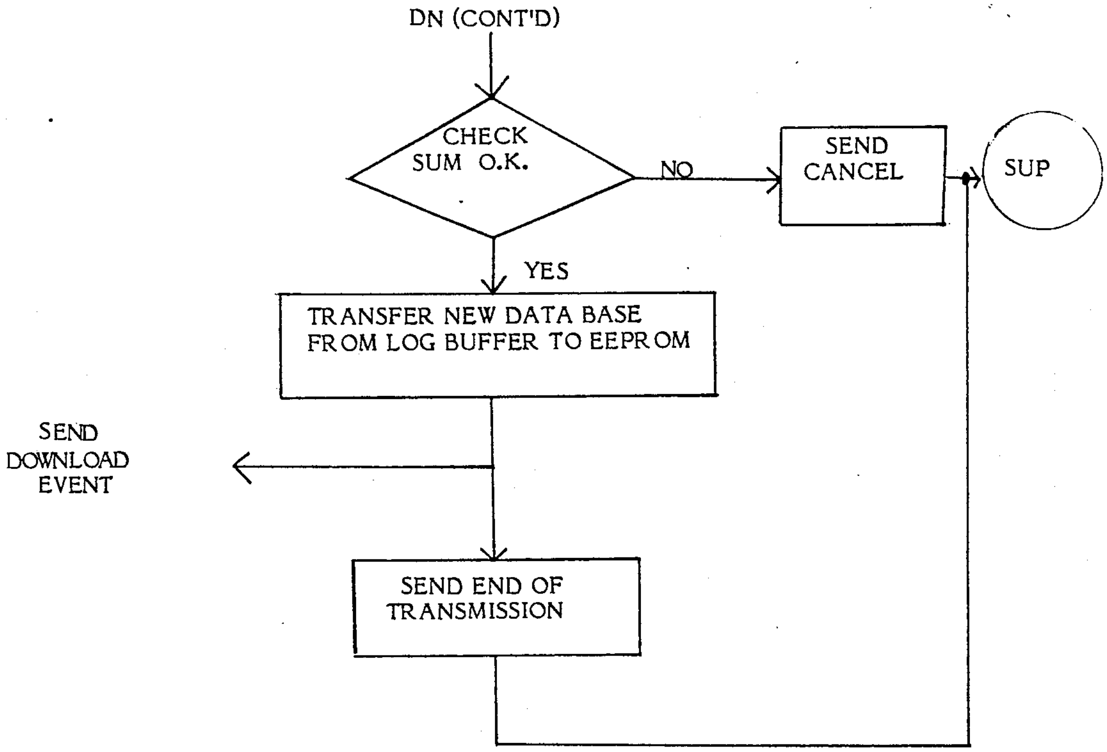
Figure 29:
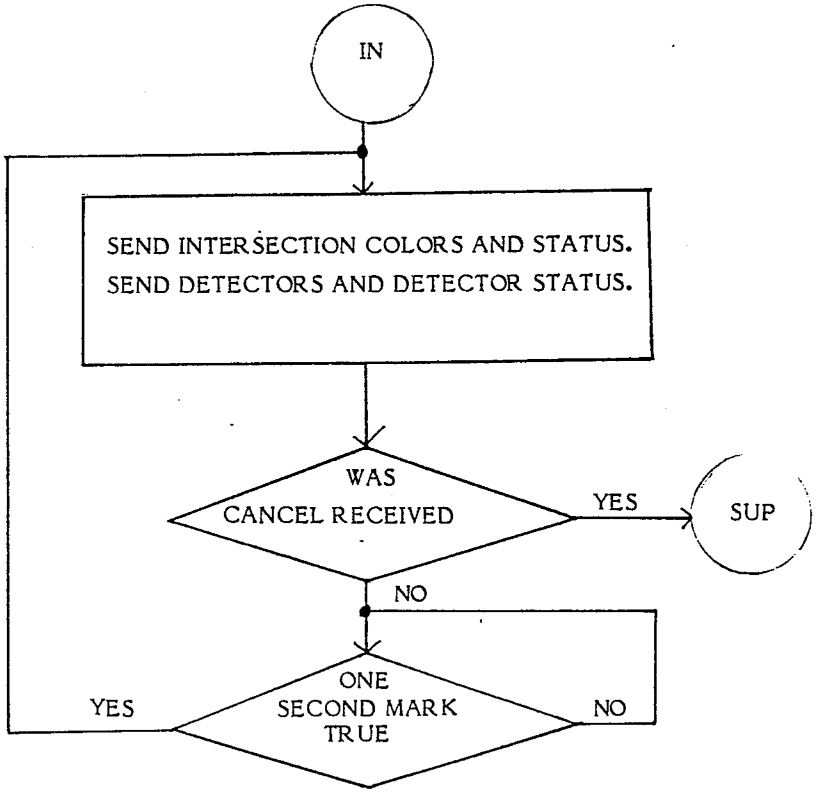
Figure 30:
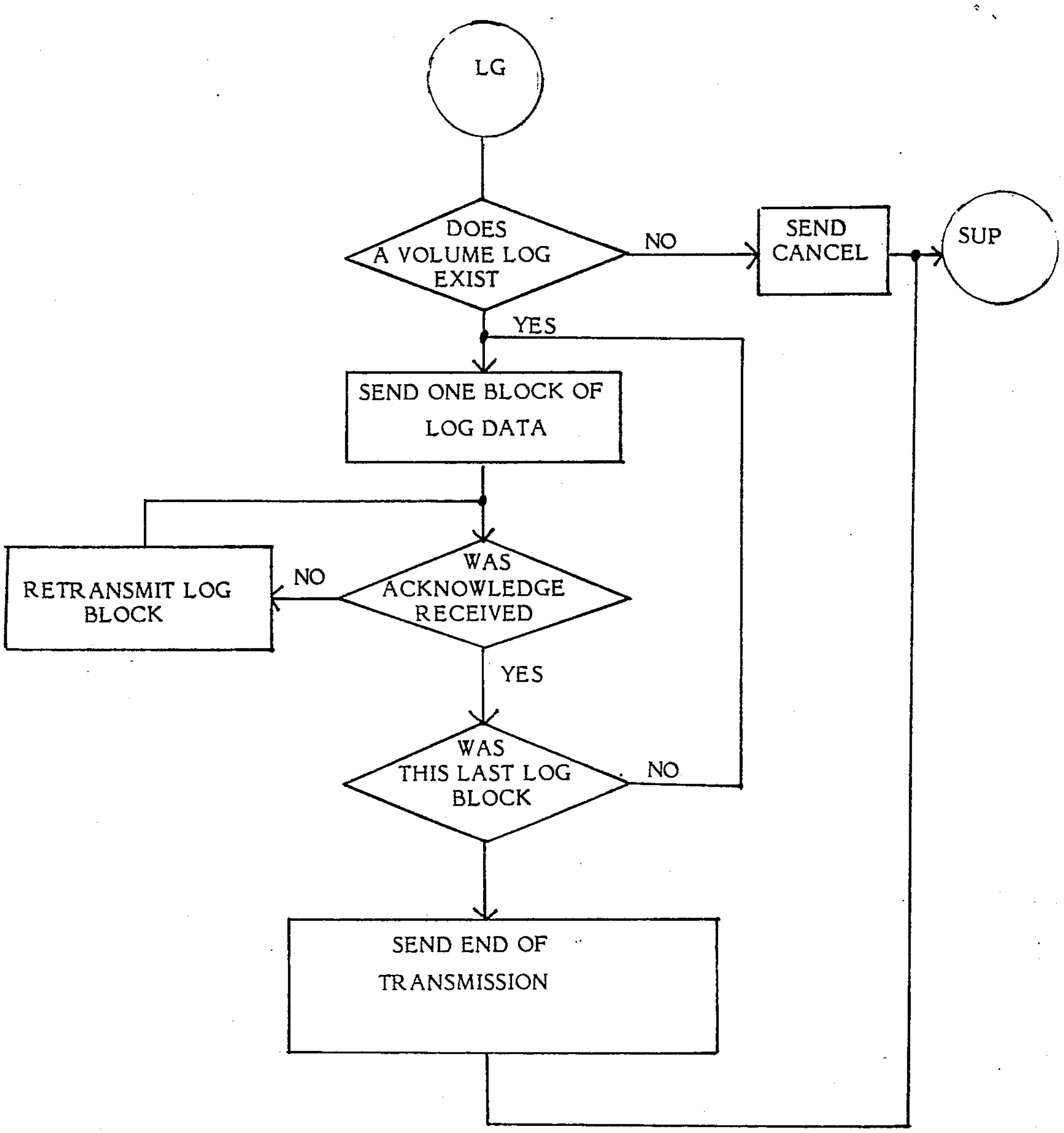
Figure 31:
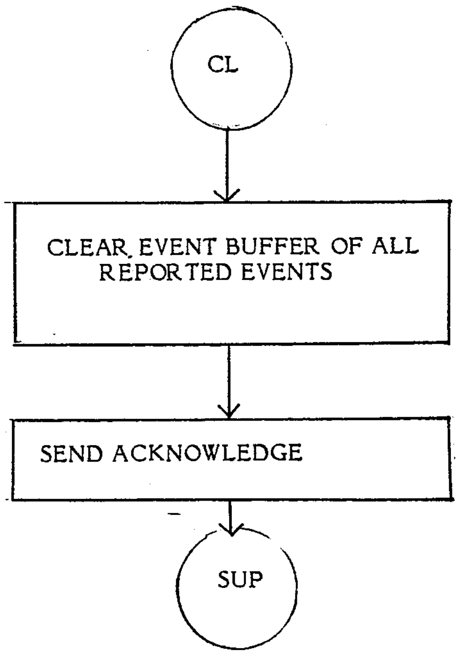
Figure 32:
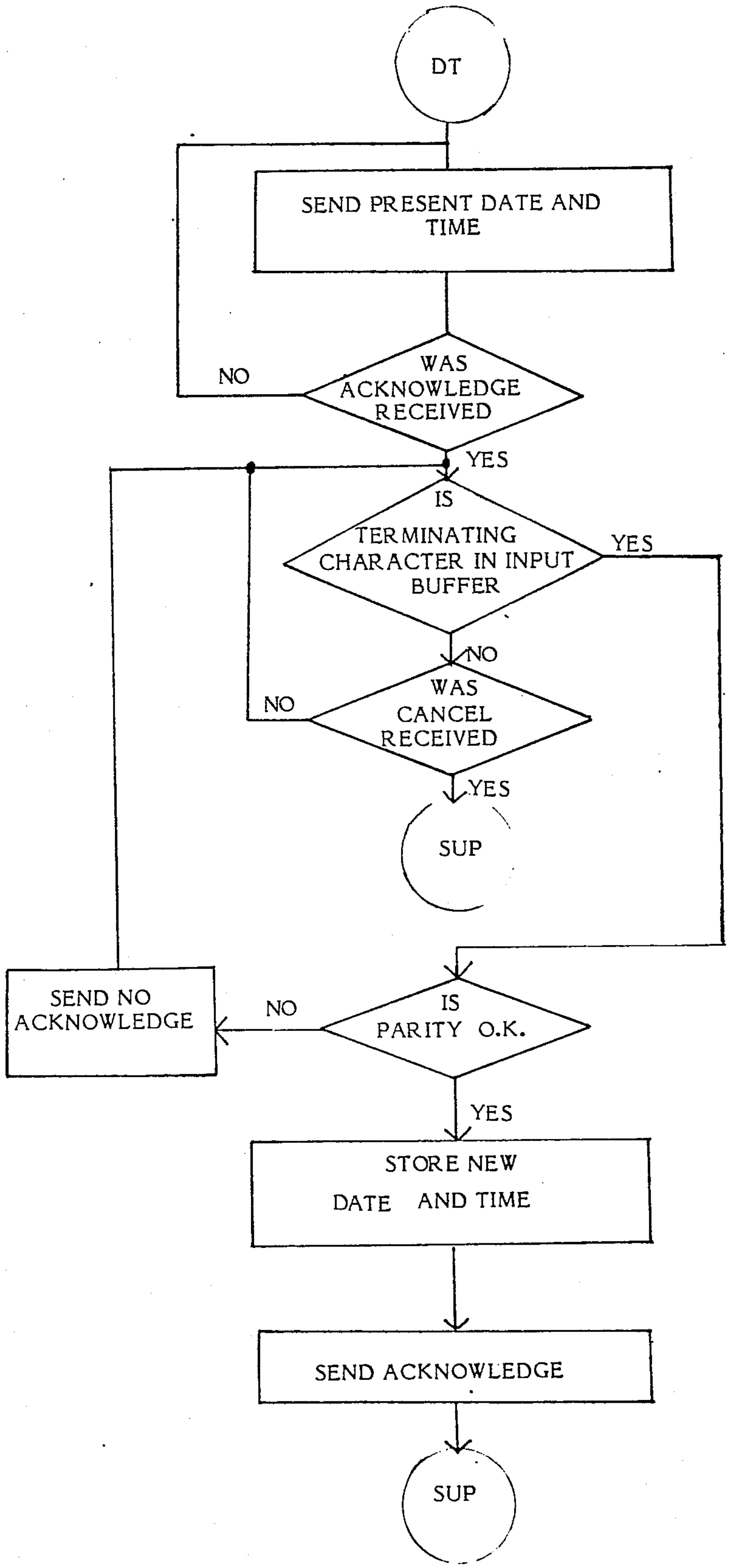
Figure 33:
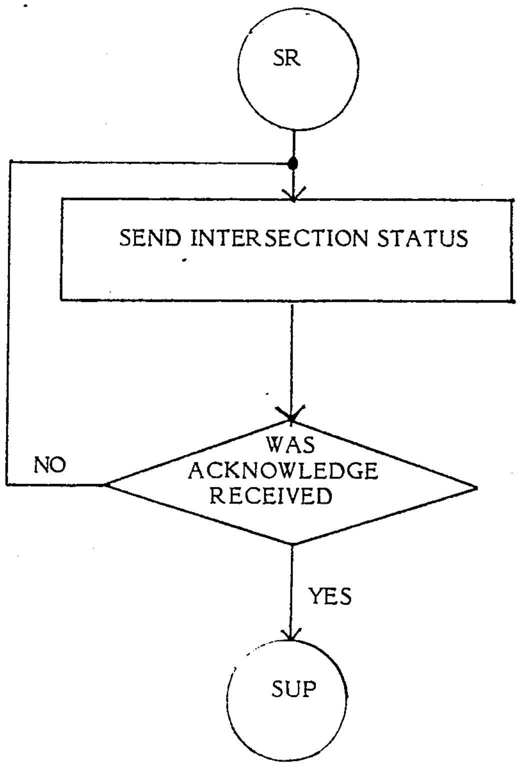

FIG. 5 describes the sequence followed by the computer upon application of power or in response to a "reset". The reference "SUP" refers to the supervisor portion of the program. The operation of the supervisor portion of the program is illustrated in FIG. 23. The supervisor portion of the program is interrupted periodically at a rate of 120 times a second in order to allow the microprocessor to perform various monitoring and diagnostic routines. FIG. 6 depicts in a flow diagram the sequence of events during each interrupt of the supervisor program. As indicated in FIG. 6, the microprocessor first determines whether the interrupt was generated by a "UART", that is, by the universal asynchronous receiver transmitted which is used to communicate over the telephone lines with the central computer. If the UART was the source of the interrupt, a character is transferred from the receive buffer of the UART to the input buffer in memory and control is returned to the supervisor portion of the program. Such UART interrupts are in addition to the interrupts at the rate of 120 times a second that perform the diagnostics set forth in FIG. 6.

As indicated in FIG. 6, once each tenth of a second, the interrupt proceeds to the sequence of diagnostics which are described in more detail in FIGS. 7 through 22. For instance, as part of the controller timing diagnostics depicted in FIG. 7, the computer asks if the controller has just started the yellow portion of a phase, and if so, it proceeds to the routine labelled JYEL depicted in FIG. 8 wherein it checks to see if the period of time during which the green signal was on exceeded the minimum green time for that phase and if this test fails it initiates the report of the failure.

Figure 10:
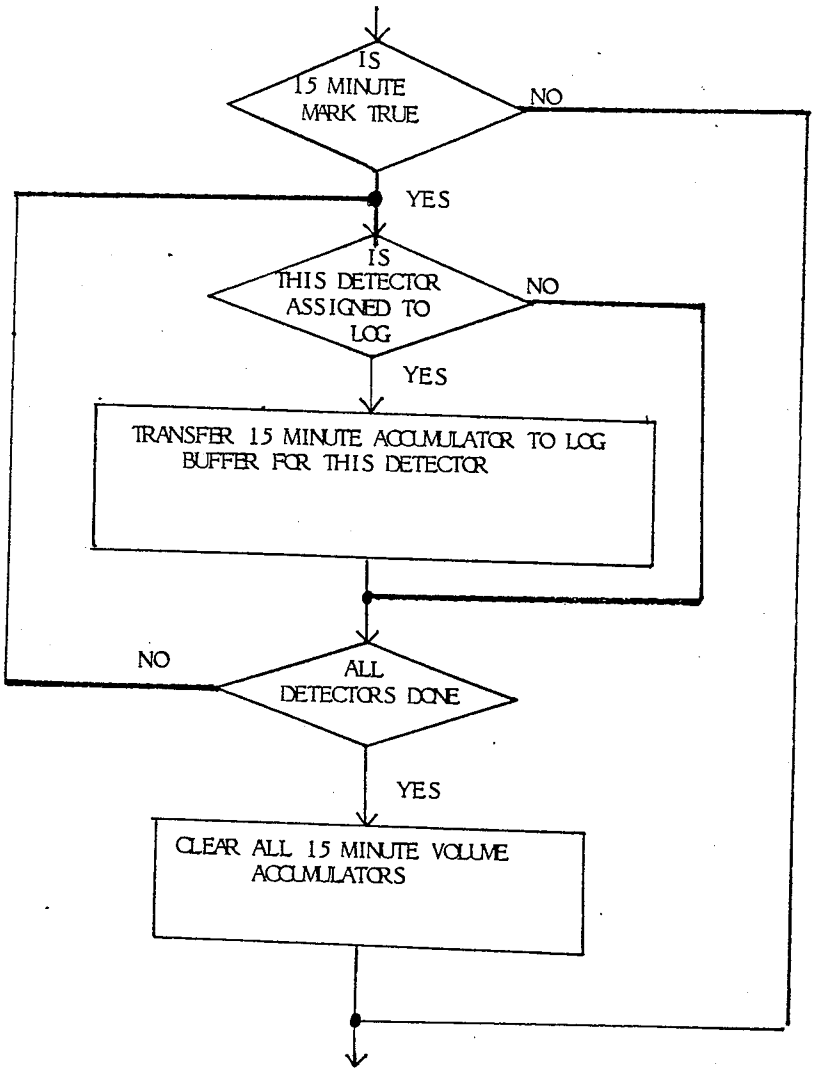
Figure 11:
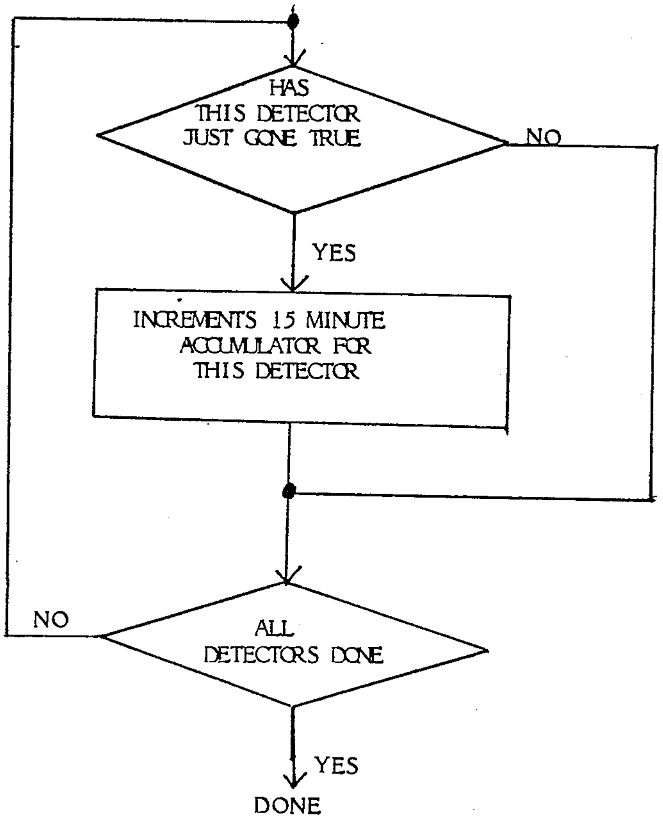
Figure 12:
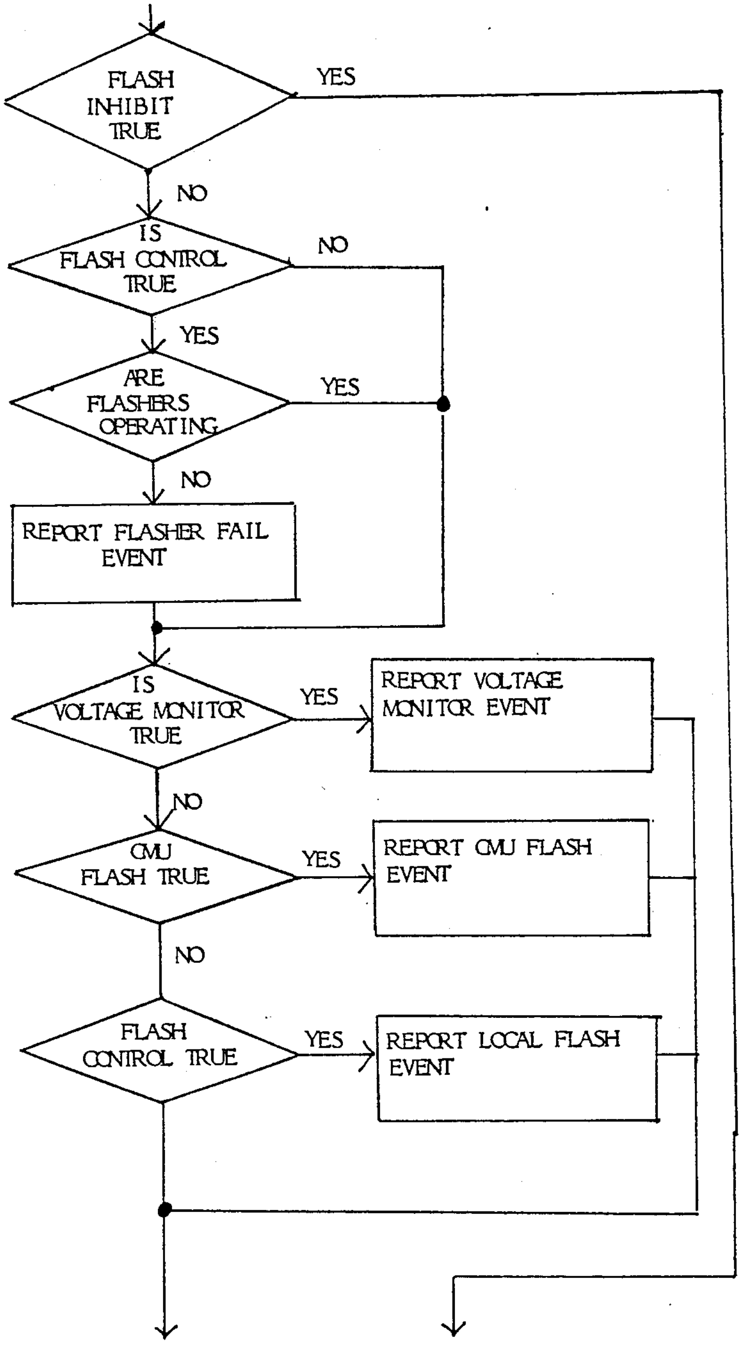
Figure 13:
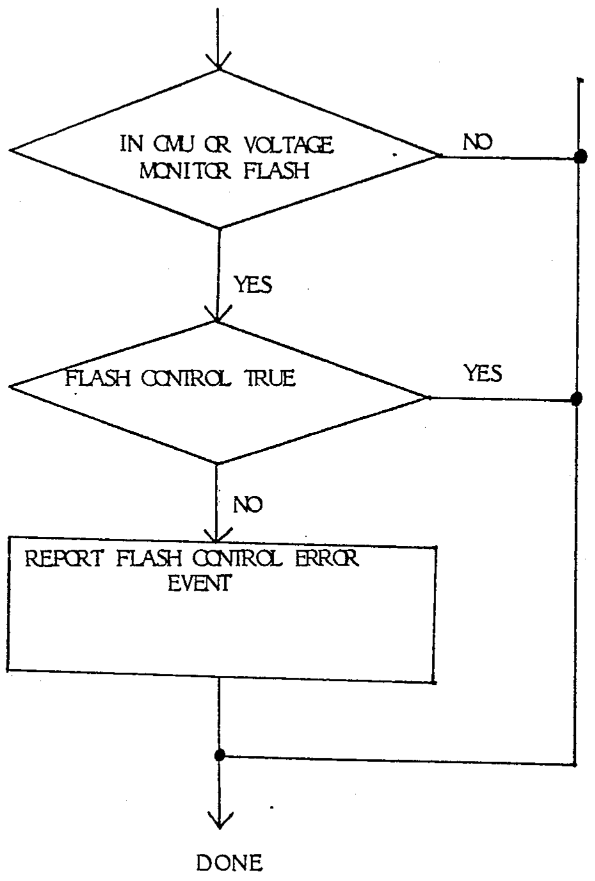
Figure 14:
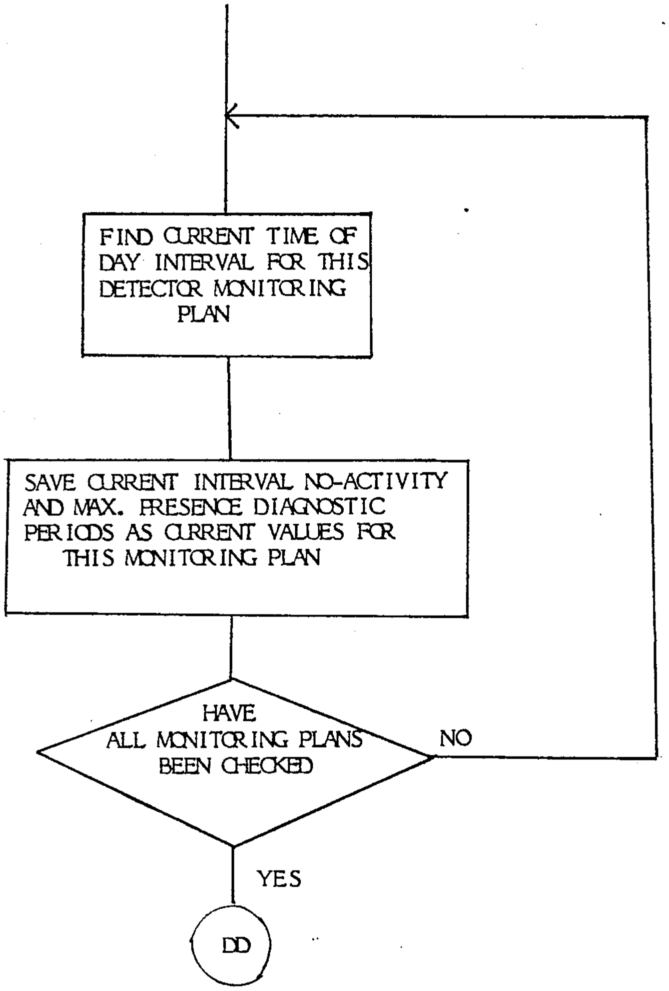
Figure 15:
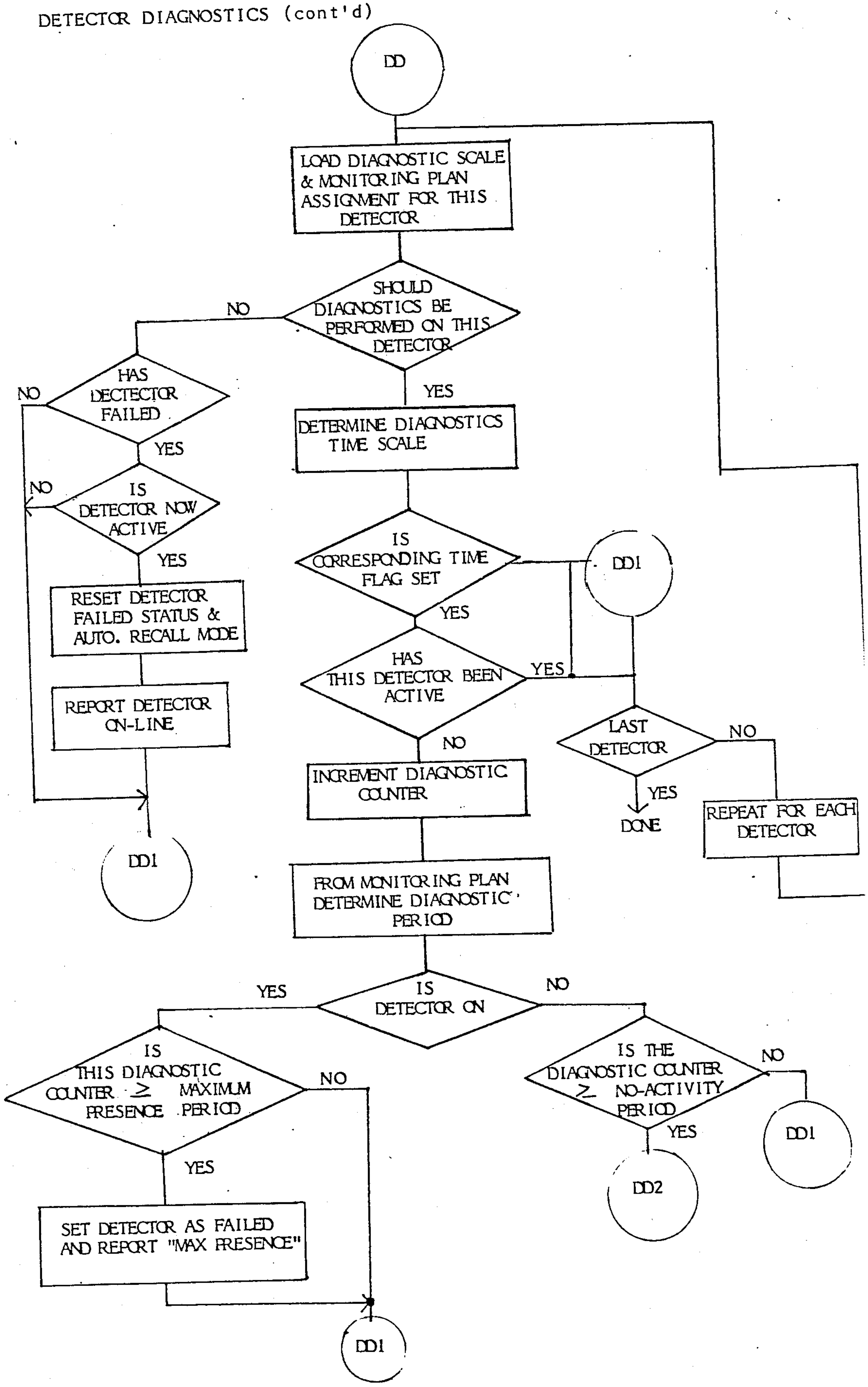
Figure 16:
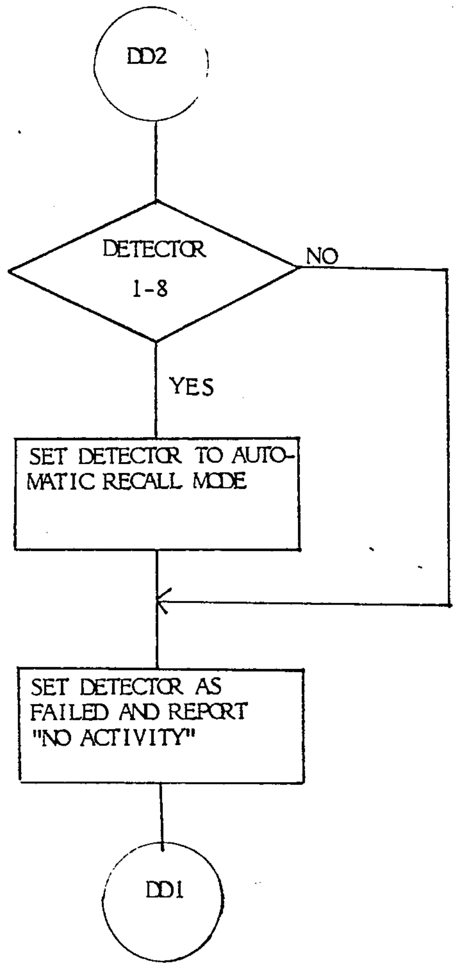

As indicated in FIG. 6, after completing the controller timing diagnostics, the interrupt sequence proceeds to the logging procedure depicted on FIG. 10 where the activity of specified automobile and pedestrian detectors is accumulated during fifteen minute intervals and the result is stored in buffers for access by the central computer. The interrupt sequence then proceeds through the flash diagnostics and the other procedures depicted in FIG. 6 and which are shown in more detail in FIG. 12 through FIG. 22.

Figure 17:
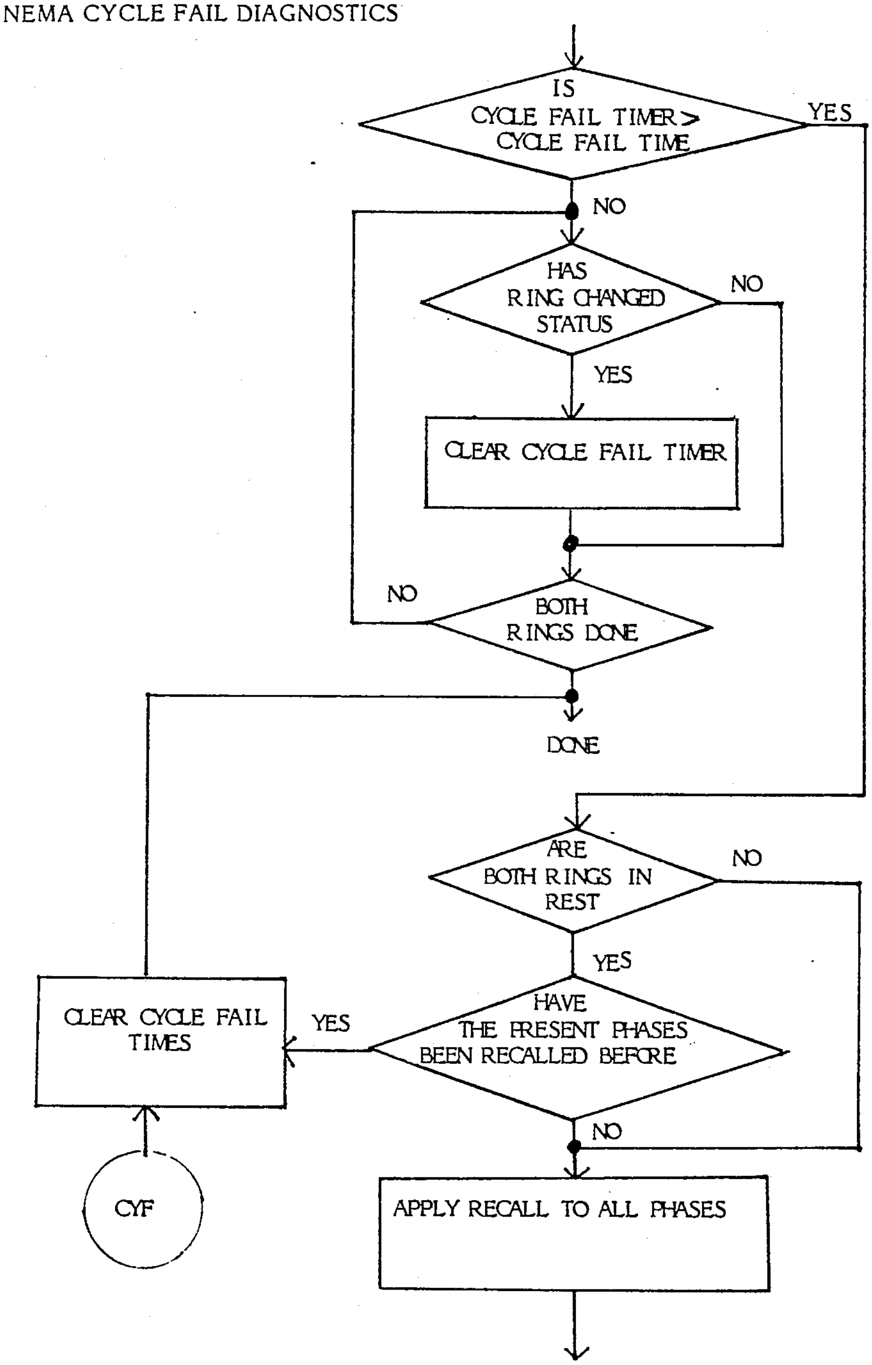
Figure 18:
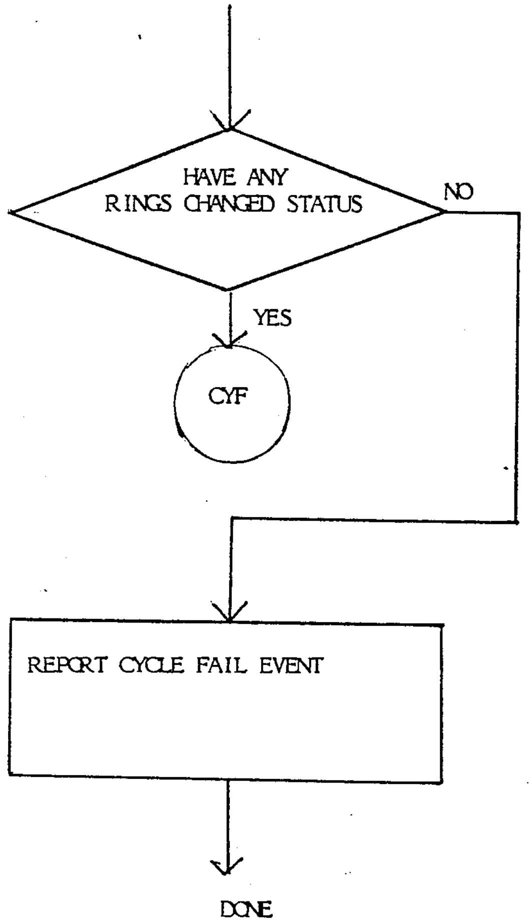
Figure 19:
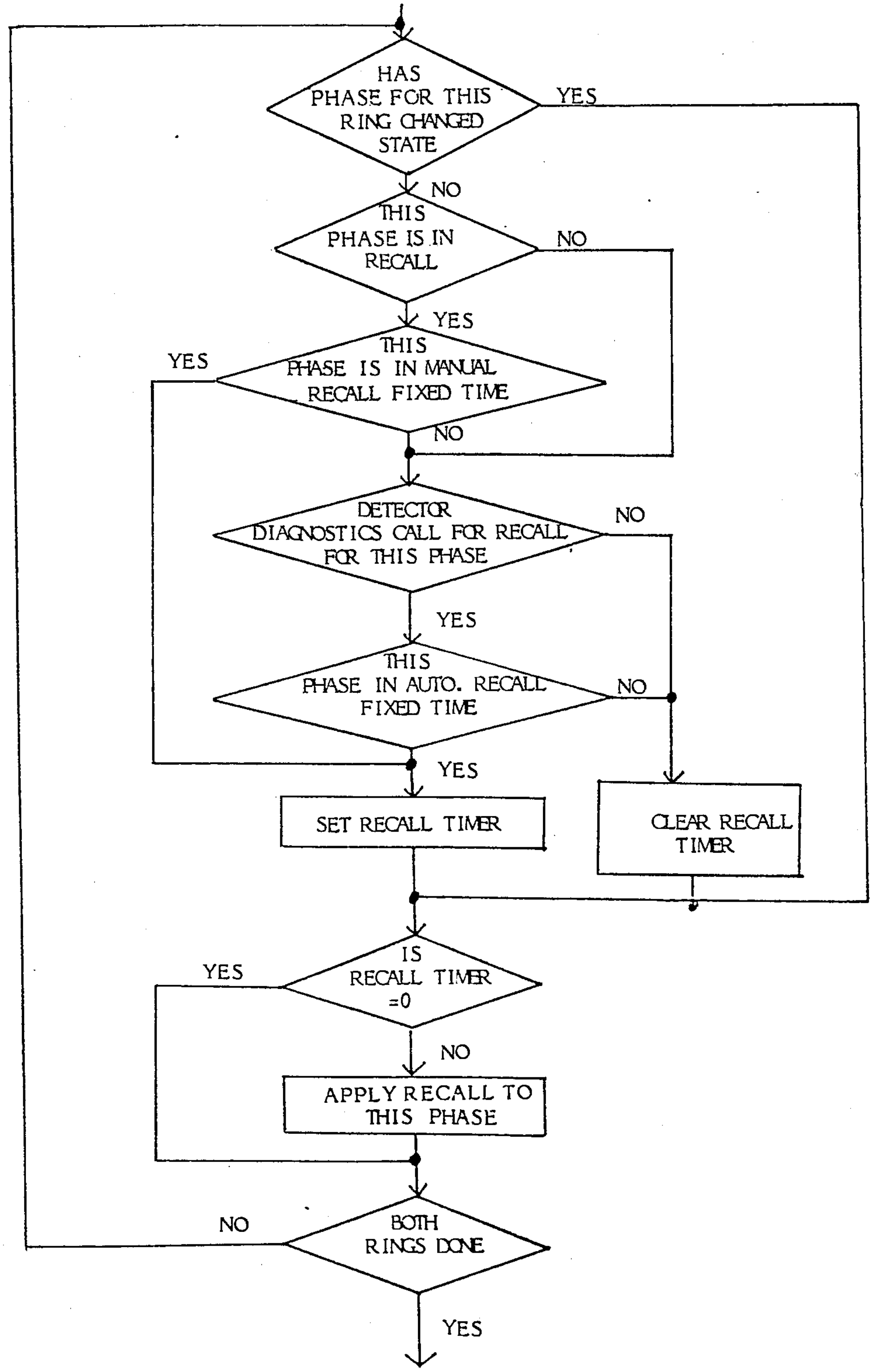
Figure 20:
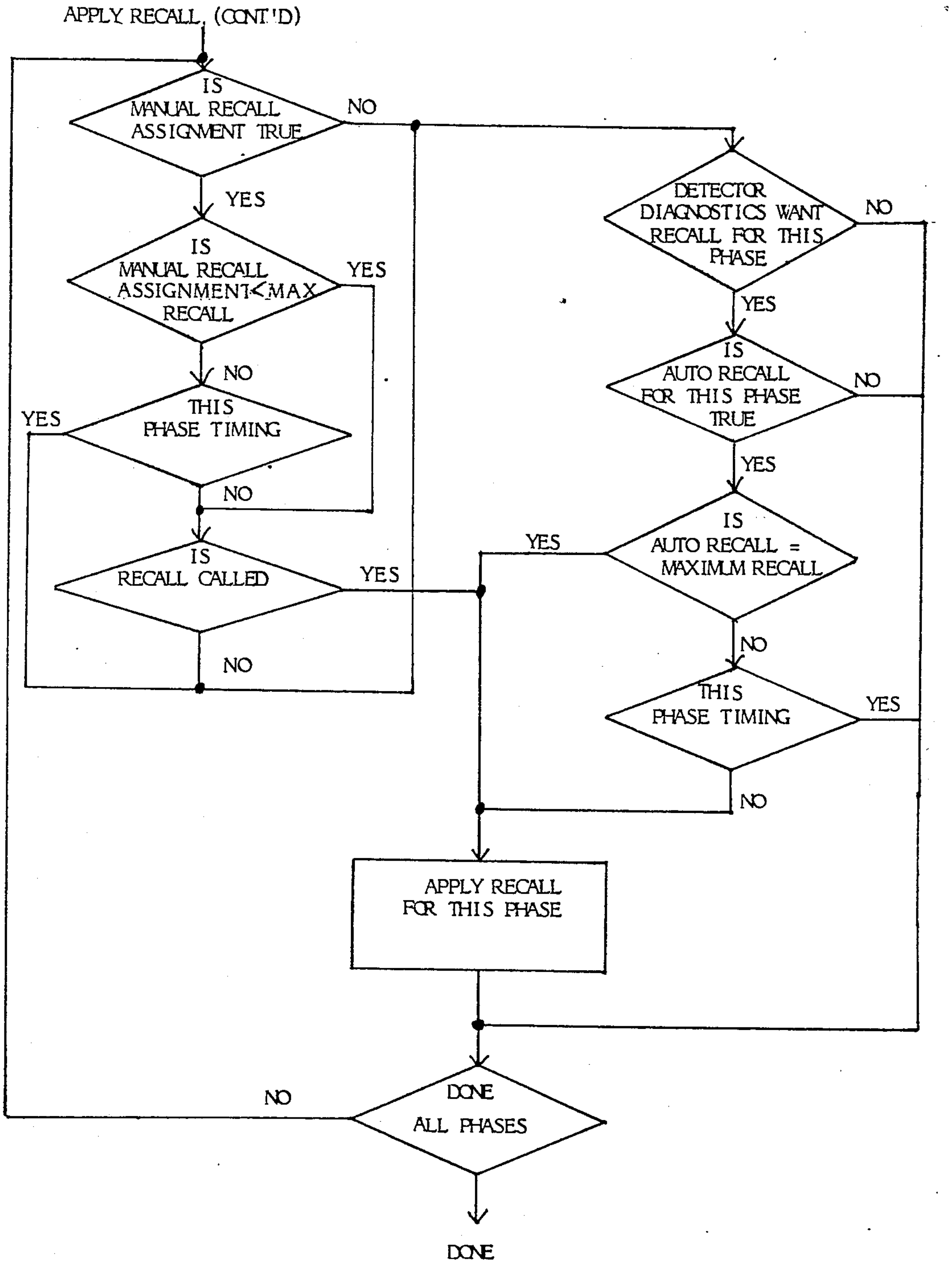
Figure 21:
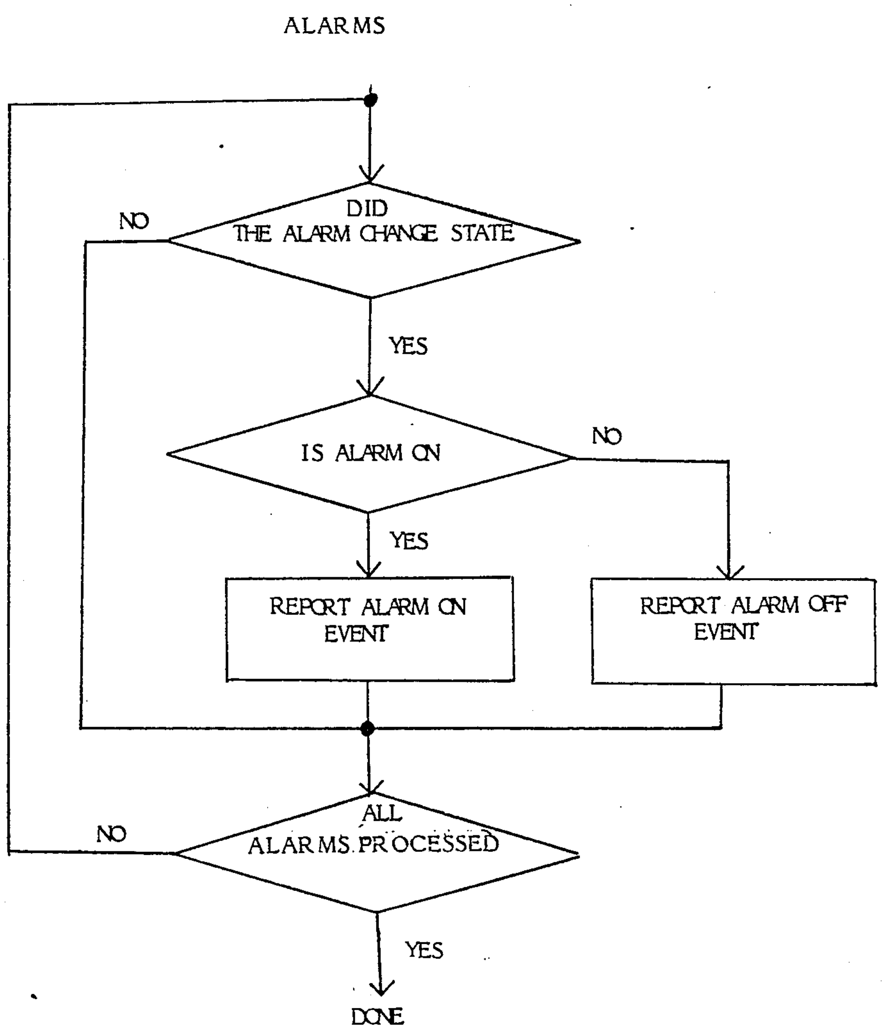
Figure 22:
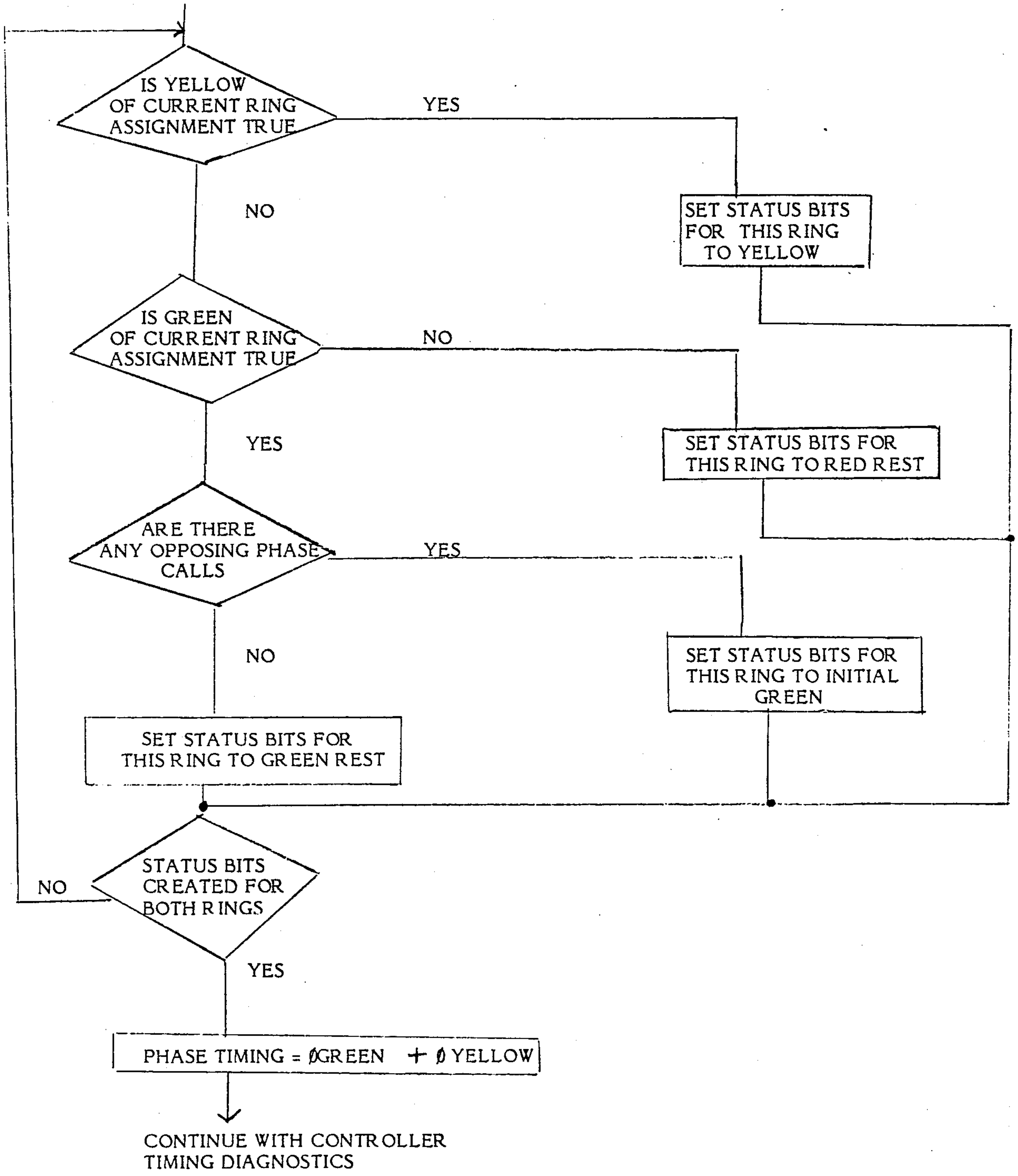

If the output from the traffic controller includes status bits the computer follows the procedure depicted in FIGS. 17 and 18 to check for any failure in the progression of phases. If the traffic signal controller does not output status bits, the equivalent of the status bit information is generated by the procedure depicted in FIG. 22.

After each interrupt procedure has been completed, the control is returned to the supervisor. The procedures within the supervisor are depicted in FIG. 23. As indicated the supervisor deals primarily with the communication between the monitor and the central computer. The various routines executed from the supervisor are listed in table 1.

TABLE 1

| ROUTINES EXECUTED FROM SUPERVISOR | |
|---|---|
| ET | Transfers all events since the last event transfer. |
| EV | Transfers all events in the event buffer. |
| MN | Accepts a download of manually command recall and the first two special functions. |
| UP | Transfers the data base. |
| DN | Accepts a download of the data base. |
| IN | Transfers intersection colors and status for purpose of intersection display. |
| LG | Transfers volume log. |
| CL | Clears event buffer of all events that have not been reported. |
| DT | Accepts a new date and time. |
| SR | Transfers intersection status. |

The various routines that are executed within the functional block denoted as "Execute Routine" in FIG. 23 and listed in Table 1 are described in more detail in FIGS. 24 through 33. These routines, as well as the steps followed during the interrupt procedure are further described in the comments that appear in the computer program listing in the appendix.

I claim:

1. A method for monitoring from a central location the operation of traffic control equipment at a plurality of remote intersections, the method comprising the steps of:

monitoring the equipment at each intersection to sense the occurrence of first, second, and third different types of events;

immediately dialing up the central location from a remote intersection to establish communication thereto over a public telephone network when a first type of event in the monitored equipment is sensed and reporting the event to the central location over the dialed up telephone network;

dialing up the central location from a remote intersection after a predetermined delay to establish communication thereto over a public telephone network when a second type of event in the monitored equipment is sensed and reporting the event to the central location over the dialed up telephone network; and reporting to the central location over the dialed up telephone network the occurrence of a third type of event at an intersection when the central location is dialed up from such intersection to report the occurrence of a first or second type of event.

2. The method of claim 1, in which the occurrence of a second type of event at an intersection is reported to the central location over the dialed up telephone network when the central location is dialed up from such intersection to report the occurrence of a first type of event within the predetermined delay instead of after the predetermined delay.

3. The method of claim 1, in which the monitoring step senses the occurrence of a fourth different type of event, the method additionally comprising the step of reporting the occurrence of the fourth type of event over a public telephone network upon inquiry from the central location.

4. A method for monitoring from a central location the operation of traffic control equipment at a plurality of remote intersections, the method comprising the steps of:

monitoring the equipment at each intersection to sense the occurrence of first and second different types of events;

immediately dialing up the central location from a remote intersection to establish communication thereto over a public telephone network when a first type of event in the monitored equipment is sensed and reporting the event and any unreported second type of events to the central location over the dialed up telephone network; and dialing up the central location from a remote intersection after a predetermined delay to establish communication thereto over a public telephone network when a second type of event in the monitored equipment is sensed unless previously reported with a first type of event and reporting the second type of event to the central location over the dialed up telephone network.

5. Apparatus for monitoring from a central location the operation of traffic control equipment at a plurality of remote intersections, the apparatus comprising:

means for monitoring the equipment at each intersection to sense the occurrence of first, second and third different types of events;

means for immediately dialing up the central location from a remote intersection to establish communication thereto over a telephone network responsive to the monitoring means when the occurrence of a first type of event is sensed;

means for reporting the occurrence of the first type of event to the central location over the dialed up telephone network;

means for dialing up the central location from a remote intersection after a predetermined delay to establish communication thereto over the telephone network responsive to the monitoring means when the occurrence of a second type of event is sensed;

means for reporting the occurrence of the second type of event to the central location over the dialed up telephone network;

means for storing a representation of the occurrence of a third type of event at an intersection; and means for reporting to the central location over the dialed up telephone network the occurrence of the third type of event at an intersection when the central location is dialed up from such intersection to report the occurrence of a first or second type of event at such intersection.

6. The apparatus of claim 5, in which the means for reporting the occurrence of the second type of event reports the occurrence of the second type of event to the central location over the telephone network dialed up responsive to the monitoring means when the occurrence of a first type of event is sensed within the predetermined time delay and the means for dialing up after a predetermined delay is in such case disabled.

7. The apparatus of claim 6, in which the monitoring means additionally senses the occurrence of a fourth type of event, the apparatus additionally comprising means for reporting the occurrence of the fourth type of event over a public telephone network upon inquiry from the central location.

* * * * *